United States Patent
Mitsugi et al.

(10) Patent No.: US 10,205,587 B2
(45) Date of Patent: Feb. 12, 2019

(54) WIRELESS COMMUNICATION SYSTEM

(71) Applicant: KYOWA ELECTRONIC INSTRUMENTS CO., LTD., Tokyo (JP)

(72) Inventors: Jin Mitsugi, Kanagawa (JP); Yuki Igarashi, Kanagawa (JP); Haruhisa Ichikawa, Tokyo (JP); Yuusuke Kawakita, Tokyo (JP); Kiyoshi Egawa, Tokyo (JP)

(73) Assignee: KYOWA ELECTRONIC INSTRUMENTS CO., LTD., Tokyo (JP)

( * ) Notice: Subject to any disclaimer, the term of this patent is extended or adjusted under 35 U.S.C. 154(b) by 0 days.

(21) Appl. No.: 15/759,830

(22) PCT Filed: Apr. 24, 2017

(86) PCT No.: PCT/JP2017/016192
§ 371 (c)(1),
(2) Date: Mar. 13, 2018

(87) PCT Pub. No.: WO2017/188181
PCT Pub. Date: Nov. 2, 2017

(65) Prior Publication Data
US 2018/0254883 A1 Sep. 6, 2018

(30) Foreign Application Priority Data

Apr. 25, 2016 (JP) .................. 2016-086860

(51) Int. Cl.
*H04B 1/00* (2006.01)
*H04B 15/00* (2006.01)
(Continued)

(52) U.S. Cl.
CPC ........ *H04L 7/0331* (2013.01); *G06K 7/10366* (2013.01); *G06K 19/07773* (2013.01);
(Continued)

(58) Field of Classification Search
CPC ....... H04L 7/0331; H04L 27/148; H04B 1/10; H04B 1/16; H04B 1/02; G06K 19/07773; G06K 7/10366
(Continued)

(56) References Cited

U.S. PATENT DOCUMENTS 5,920,840 A * 7/1999 Satyamurti ............. G10L 21/04
704/267
6,842,495 B1 * 1/2005 Jaffe ........................ H04B 1/68
329/304
(Continued)

FOREIGN PATENT DOCUMENTS

| JP | 2003168991 A | 6/2003 |
|---|---|---|
| JP | 2010016785 A | 1/2010 |

(Continued)

OTHER PUBLICATIONS

Igarashi, Yuki et al., "A performance analysis of interference rejection technique in multi-subcarrier multiple access", 2015 IEEE International Conference on RFID Technology and Applications, Sep. 2015, pp. 33-38, Institute of Electrical and Electronics Engineers, USA.
(Continued)

*Primary Examiner* — Eugene Yun
(74) *Attorney, Agent, or Firm* — Rankin, Hill & Clark LLP

(57) ABSTRACT

Provided is a wireless communication system which enables wireless communication in which crosstalk due to multiple access is canceled while using a large number of inexpensive wireless terminals. In order to generate an interference
(Continued)

component, an analysis data sequence is generated by applying a Hilbert transform, by a Hilbert transform, to a subcarrier data sequence obtained by extracting a target subcarrier wave component from a finite length data sequence, while a carrier phase difference $\Psi$ is estimated by using the regression analysis by a carrier wave phase estimation unit. After rotation calculation configured to return the analysis data sequence by the carrier phase difference $\Psi$ is performed, conversion into an angle is performed. Further, a multiplication by a desired odd number of multiplication is performed, and then an inverse Hilbert transform is applied.

5 Claims, 13 Drawing Sheets

(51) Int. Cl.
    *H04L 7/033*     (2006.01)
    *G06K 7/10*     (2006.01)
    *G06K 19/077*     (2006.01)
    *H04B 1/10*     (2006.01)
    *H04L 27/148*     (2006.01)
    *H04B 1/02*     (2006.01)
    *H04B 1/16*     (2006.01)

(52) U.S. Cl.
    CPC ............. *H04B 1/10* (2013.01); *H04L 27/148* (2013.01); *H04B 1/02* (2013.01); *H04B 1/16* (2013.01)

(58) Field of Classification Search
    USPC ........................................................ 455/63.1
    See application file for complete search history.

(56) References Cited

U.S. PATENT DOCUMENTS

| | | | |
|---|---|---|---|
| 2011/0012723 A1* | 1/2011 | Adamson | ............ B60C 23/0408 340/447 |
| 2011/0129047 A1* | 6/2011 | Mashino | .............. H04B 1/1027 375/350 |

FOREIGN PATENT DOCUMENTS

| | | |
|---|---|---|
| JP | 2011516332 A | 5/2011 |
| JP | 2016076881 A | 5/2016 |

OTHER PUBLICATIONS

Igarashi, Yuki et al., "A Feasibility Study on Simultaneous Data Collection from Multiple Sensor RF Tags with Multiple Subcarriers", 2014 IEEE International Conference on RFID (IEEE RFID), Apr. 2014, pp. 141-146, Institute of Electrical and Electronics Engineers, USA.

International Search Report dated Jul. 18, 2017 filed in PCT/JP2017/016192.

* cited by examiner

WIRELESS COMMUNICATION SYSTEM

TECHNICAL FIELD

The present invention relates to a wireless communication system using a plurality of wireless tags.

BACKGROUND ART

In wireless communication, since signals transmitted simultaneously from a plurality of transmitters cause crosstalk at a receiver, signal transmission is not normally performed. Therefore, in order to avoid crosstalk in wireless communication using a large number of transmitters, multiple access such as code division multiple access (CDMA), time division multiple access (TDMA), and frequency division multiple access (FDMA) are used.

Patent Literature 1 discloses a receiving apparatus and a receiving method that can reduce influence of an interference signal while suppressing an increase in circuit scale and in processing time.

CITATION LIST

Patent Literature

PATENT LITERATURE 1: JP-A-2010-16785

SUMMARY OF THE INVENTION

Problems to be Solved by the Invention

TDMA using burst transmission, FDMA, and CDMA are used to realize substantially simultaneous communication from a plurality of terminals by a typical wireless communication system.

Burst transmission is not suitable in view of high-speed clock, clock synchronization, and data accumulation in a wireless tag aiming at smaller size and lower cost with a simple circuit scale. In order to realize FDMA, it is necessary to have a channel filter capable of making carrier channel variable on the wireless tag side. In particular, it is difficult to realize FDMA in a passive wireless tag using reflection of radio waves and load modulation. In CDMA, a spreading code needs to be given. In addition to this, since a far-near problem occurs, power control needs to be performed on the wireless tag side. It is also difficult to realize this in an inexpensive wireless tag, particularly in the passive wireless tag using reflection.

Therefore, typically, TDMA without burst transmission is used in a wireless tag system. Timing is supplied from a receiver (reader/writer). Therefore, a plurality of wireless tags could not perform transmission at substantially the same time. Therefore, there has been a problem in data transmission at high speed from a plurality of tags and acquisition of plural synchronized sensor data. Therefore, it has been desired to carry out, as simply as possible, multiple access capable of simultaneous transmission.

An object of the present invention is to solve such a problem. It is a further object of the present invention to provide a wireless communication system which enables simultaneous transmission in which crosstalk due to multiple access has been canceled, the simultaneous transmission being from a wireless tag, while using a large number of inexpensive wireless terminals.

Solutions to the Problems

In order to solve the above problem, the wireless communication system of the present invention includes a carrier wave source configured to emit an unmodulated carrier wave, and a plurality of passive terminals configured to superimpose, on the carrier wave, a subcarrier wave having a predetermined frequency for each terminal, modulate the subcarrier wave according to a predetermined modulation method based on a signal generated by a signal source, and transmit a backward scattered wave (backscatter). The wireless communication system of the present invention further includes a receiver configured to receive a plurality of backscatters transmitted from the plurality of passive terminals, and demodulate the signal of the signal source in each passive terminal by successively canceling interference components between backscatters.

The receiver includes an IQ converter configured to generate a finite length data sequence having an I component and a Q component by converting a received radio wave into a processing frequency and then performing orthogonal transformation, and a high-pass filter configured to cancel, after A/D conversion, a phase noise of the carrier wave and a bias component of the signal. The receiver includes a first band pass filter configured to form a first subcarrier data sequence by selectively passing a frequency of the subcarrier wave included in the finite length data sequence that has passed through the high-pass filter, and a second band pass filter configured to form a second subcarrier data sequence by selectively passing the subcarrier wave frequency different from that of the first band pass filter.

Further, since the subcarrier data sequence crosses zero on an IQ plane, the receiver includes a Hilbert transformer configured to perform a Hilbert transform to generate an analysis data sequence which does not cross zero, a carrier wave phase estimation unit configured to estimate a phase delay of the carrier wave included in the subcarrier data sequence to obtain a carrier phase difference, and a PLL processor configured to generate an angle data sequence from the analysis data sequence and the carrier phase difference.

The receiver further includes: an angle multiplication processor configured to multiply the angle data sequence by a desired odd number of multiplication to obtain a multiplied angle data sequence; an inverse Hilbert transformer configured to obtain an odd multiplied harmonic data sequence which crosses zero by performing projective transformation using the multiplied angle data sequence, the carrier phase difference, and an amplitude adjustment value taken out from the analysis data sequence; and an interference canceller configured to subtract the odd multiplied harmonic data sequence from the second subcarrier data sequence.

Advantageous Effects of the Invention

According to the present invention, it is possible to provide a wireless communication system which enables wireless communication in which crosstalk due to multiple access is canceled while using a large number of inexpensive wireless terminals.

The problems, configurations, and effects other than those described above will be clarified from a description of the following embodiments.

DESCRIPTION OF EMBODIMENTS

An outline of an embodiment of the present invention (hereinafter referred to as a "present embodiment") will be described.

The present invention is an improvement on an embodiment described in Japanese Patent Application No. 2014-207279 (hereinafter referred to as a "prior application"). A part of inventors of the prior application is the same as inventors of the present invention. The prior application relates to a wireless communication system using a multiple subcarrier multiple access (MSMA). In the prior application, the invention was completed by verification at a laboratory level. In the present embodiment, the invention of the prior application has been developed to a practical level by performing verification at a more practical level. As a result, the present embodiment has been completed. Specific differences from the prior application invention in the present embodiment lie in a successive interference canceller included in a software receiver, and a peripheral portion thereof.

[Overall Configuration of Wireless Communication System 101]

Figure 1:
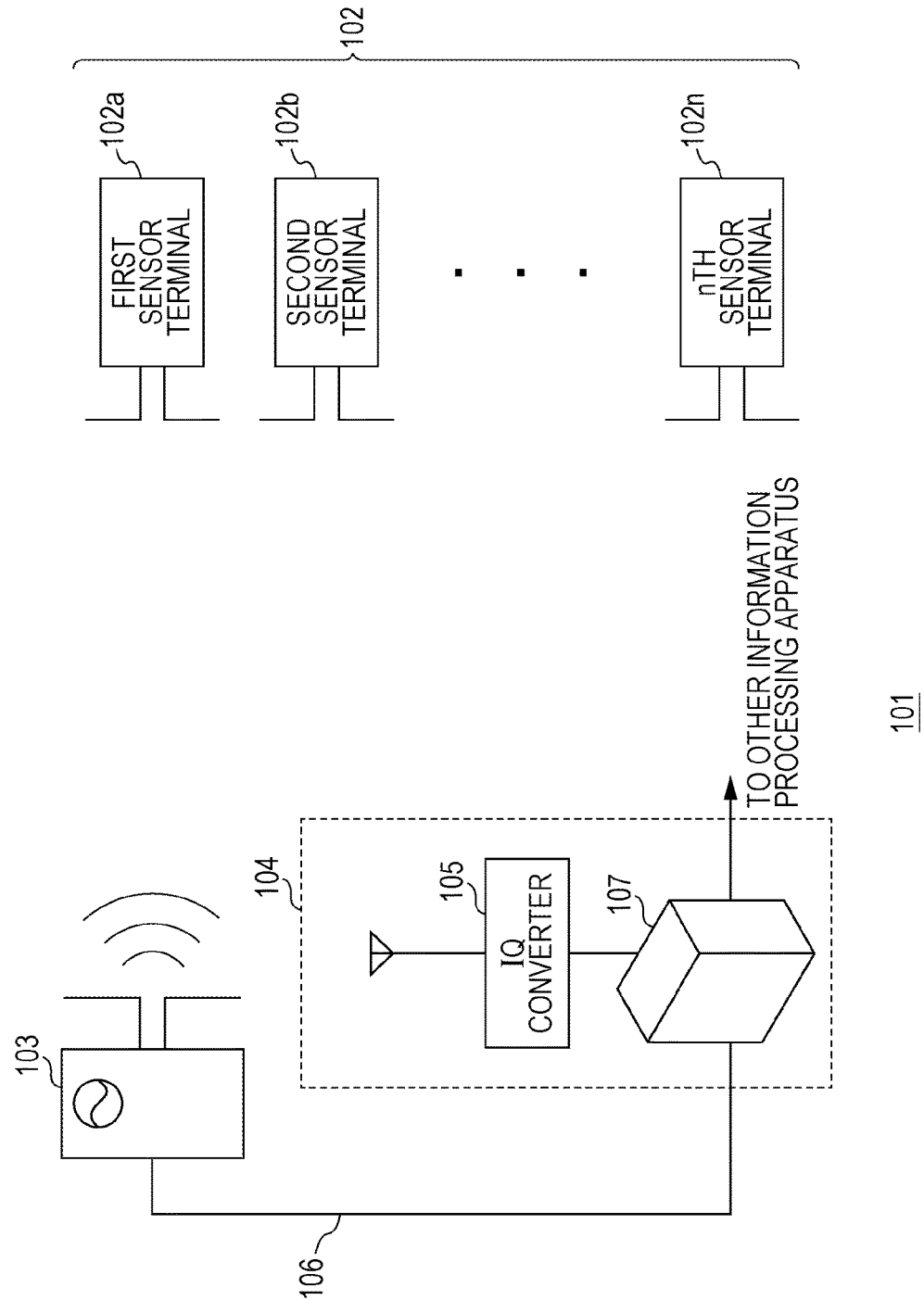
FIG. 1 is a schematic block diagram showing an overall configuration of a wireless communication system according to the present embodiment.

FIG. 1 is a schematic block diagram showing an overall configuration of a wireless communication system 101 according to the present embodiment. A first sensor terminal 102a, a second sensor terminal 102b, - - - , and an nth sensor terminal 102n are attached to a measurement object (not shown). This measurement object includes large structures and the like such as an aircraft fuselage and a tunnel. It should be noted that when the first sensor terminal 102a, the second sensor terminal 102b, - - - , and the nth sensor terminal 102n are not distinguished from each other, these sensor terminals are simply abbreviated as the sensor terminal 102.

An interrogator 103 and a receiver 104 are provided in a vicinity of these sensor terminals 102. The receiver 104 includes an IQ converter 105 and a software receiver 107. The interrogator 103 is connected to the software receiver 107 through a network 106.

The sensor terminal 102 is obtained by equipping a well-known wireless tag using a backscatter (load modulation) with an acceleration sensor and an analog modulation circuit. The analog modulation circuit is, for example, a well-known phase modulator to which a varicap is connected in parallel in addition to a coil and a capacitor. In this phase modulator, phase modulation is applied to a carrier wave by applying an output voltage of the acceleration sensor to the varicap.

The interrogator 103 also called a reader/writer has a function of performing bidirectional wireless data communication with the sensor terminal 102 and a function of transmitting an unmodulated wave.

The first sensor terminal 102a, the second sensor terminal 102b, - - - , and the nth sensor terminal 102n each perform a predetermined communication with the interrogator 103. Then, a radio wave obtained by modulating a signal emitted by a sensor with the backscatter is transmitted (reflected) in association with the unmodulated wave transmitted from the interrogator 103. The receiver 104 receives the radio waves transmitted from the plurality of sensor terminals 102. Further, the receiver 104 demodulates the signals of the respective sensors by arithmetic processing.

The interrogator 103 performs bidirectional communication for assigning a unique subcarrier wave frequency to the plurality of sensor terminals 102. The interrogator 103 transmits a sensor terminal list generated as the result to the receiver 104 through the network 106. The receiver 104 analyzes and demodulates received data 210 received based on the sensor terminal list.

[Wireless Communication Procedure in Wireless Communication System 101]

The wireless communication system 101 according to the present embodiment executes two main wireless communication steps.

As a first step, the interrogator 103 separately performs wireless data communication with each sensor terminal 102 prior to simultaneously receiving measurement signals from the sensor terminals 102. In this wireless data communication, the interrogator 103 assigns a unique subcarrier wave frequency to each sensor terminal 102. Then, the interrogator 103 generates the sensor terminal list in which a relationship between the sensor terminal 102 and the subcarrier wave frequency is written. The interrogator 103 transmits this sensor terminal list to the receiver 104.

Next, as a second step, the interrogator 103 emits an unmodulated carrier wave. Each sensor terminal 102 superimposes a subcarrier wave modulated by a signal of a built-in acceleration sensor on this unmodulated wave. Further, responses are sent to the receiver 104, based on the backscatter. At this time, the interrogator 103 functions as a carrier wave source.

The receiver 104 receives a received signal including a plurality of backscatters simultaneously received from each sensor terminal 102. The receiver 104 converts this received signal into a finite length data sequence. This finite length data sequence includes mixed received signals simultaneously received from the respective sensor terminals 102. Therefore, the received signals other than the received signal to be originally demodulated are interference components. Therefore, the software receiver 107 described below is configured to demodulate a target received signal while successively canceling the interference components from the finite length data sequence.

In the present embodiment, a process of successively canceling the interference components from the received signals performed by the receiver 104 is hereinafter referred to as a "successive interference cancellation".

[Sensor Terminal List]

The sensor terminal list is a list in which modulation methods and the subcarrier wave frequencies respectively set for the sensor terminals 102, and a demodulation order are written. Here, the demodulation order is determined based on a strength of the radio wave received by the receiver 104 and the subcarrier wave frequency. This sensor terminal list includes a terminal ID field, a modulation method field, a subcarrier wave frequency field, and a demodulation order field. The terminal ID field stores a terminal ID for uniquely identifying the sensor terminal 102. The modulation method field stores the modulation method set for the sensor terminal 102. The subcarrier wave frequency field stores the subcarrier wave frequency set for the sensor terminal 102. The demodulation order field stores the demodulation order of the sensor terminal 102.

The sensor terminal 102 can employ any analog modulation method as the modulation method. Amplitude modulation (AM), frequency modulation (FM), phase modulation (PM), pulse width modulation (PWM), and the like can be used as analog modulation. Although the AM can be employed in principle, it is not practical. This is because various fluctuation factors in a space are directly mixed into a modulation component of the radio wave as noise. Further, strictly speaking, the pulse width modulation is out of a category of the analog modulation. However, in the present embodiment, the pulse width modulation is included in available modulation methods from a viewpoint that the analog signal can be modulated as it is without being converted to digital data by A/D converter. It should be noted that when all the sensor terminals 102 have the same modulation method, the modulation method field in the sensor terminal list is not necessary.

[Sensor Terminal 102]

Figure 2:
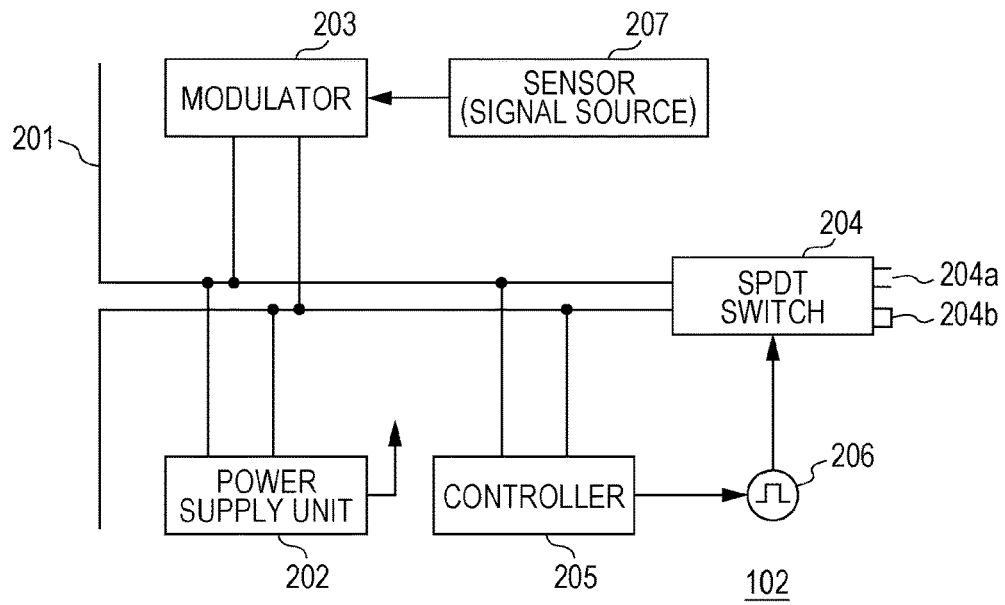
FIG. 2 is a block diagram showing a hardware configuration of a sensor terminal.

FIG. 2 is a block diagram showing a hardware configuration of the sensor terminal 102.

The sensor terminal 102 does not have an independent power supply like a battery. Instead of this, the sensor terminal 102 has a power supply unit 202 which converts electric power of the radio wave received from an antenna 201 into circuit driving power. Therefore, the sensor terminal 102 is a passive terminal.

In addition to the power supply unit 202, a modulator 203, an SPDT (single pole double throw) switch 204, and a controller 205 are connected to the antenna 201.

The SPDT switch 204 is connected to the antenna 201 while switching between an open end 204a and a short-circuited end 204b based on a rectangular wave signal (subcarrier wave) output from a subcarrier wave source 206. Impedance of the antenna 201 varies with a cycle of the subcarrier wave by this SPDT switch 204. Then, the subcarrier wave is superimposed on a reflected wave of the unmodulated wave obtained from the antenna 201. A frequency of the subcarrier wave generated by the subcarrier wave source 206 is determined by the controller 205 controlling the subcarrier wave source 206.

That is, the controller 205 stores the frequency instructed by the interrogator 103 at a time of communication with the interrogator 103 in the first step. Then, the controller 205 controls the subcarrier wave source 206 so that the subcarrier wave having the stored frequency is generated in the second step.

A sensor 207 which is a signal source is connected to the modulator 203. The sensor 207 is a sensor which outputs an AC signal; for example, an acceleration sensor and the like. The modulator 203 performs, based on a signal of the sensor 207, modulation such as phase modulation (PM), frequency modulation (FM), pulse width modulation, or the like on the subcarrier wave.

With the above configuration, the sensor terminal 102 superimposes the subcarrier wave on the unmodulated wave transmitted from the interrogator 103 which is an unmodulated wave source, and further applies a well-known backscatter (load modulation) on the subcarrier wave. Then, the antenna 201 transmits the reflected wave obtained by applying, based on the signal of the sensor 207, phase modulation, frequency modulation, or pulse width modulation to the subcarrier wave.

[Interrogator 103]

Figure 3:
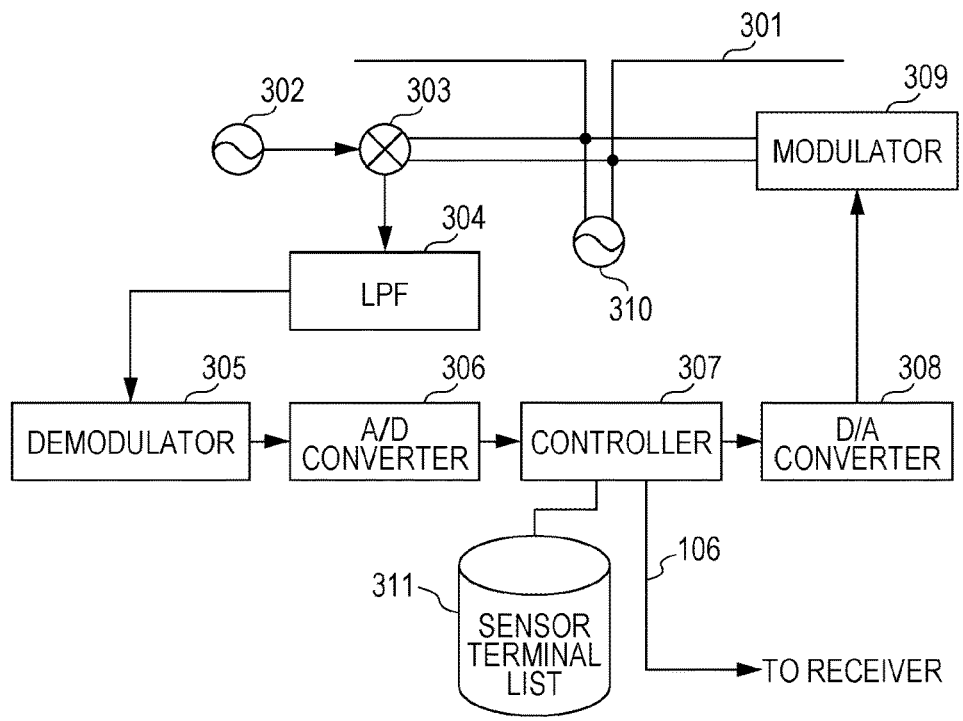
FIG. 3 is a block diagram showing a hardware configuration of an interrogator.

FIG. 3 is a block diagram showing a hardware configuration of the interrogator 103.

The radio wave received from an antenna 301 is converted to a signal having a low frequency through a local oscillator 302, a mixer 303, and a LPF 304. This signal is supplied to a demodulator 305 and demodulation is performed. Then, conversion to digital data is performed by an A/D converter 306. Further, supply to the controller 307 including a microcomputer is performed.

The controller 307 interprets information of the sensor terminal 102 included in the digital data to generate an instruction to the sensor terminal 102. The digital data included in this instruction is converted to an analog signal by a D/A converter 308. Then, a modulator 309 modulates the carrier wave emitted from a carrier wave source 310.

The controller 307 grasps all the sensor terminals 102 existing within a communicable range by an interactive process with the sensor terminals 102. Then, the controller 307 assigns the subcarrier waves having a unique frequency to the sensor terminals 102. Then, the controller 307 generates a sensor terminal list 311 including a correspondence relationship between the sensor terminal 102 and the subcarrier wave. The controller 307 transmits the sensor terminal list 311 to the receiver 104 through the network 106. That is, the interrogator 103 has a function of transmitting, to each sensor terminal 102, a control command for assigning a unique subcarrier wave to the sensor terminal 102.

[IQ Converter 105]

Figure 4:
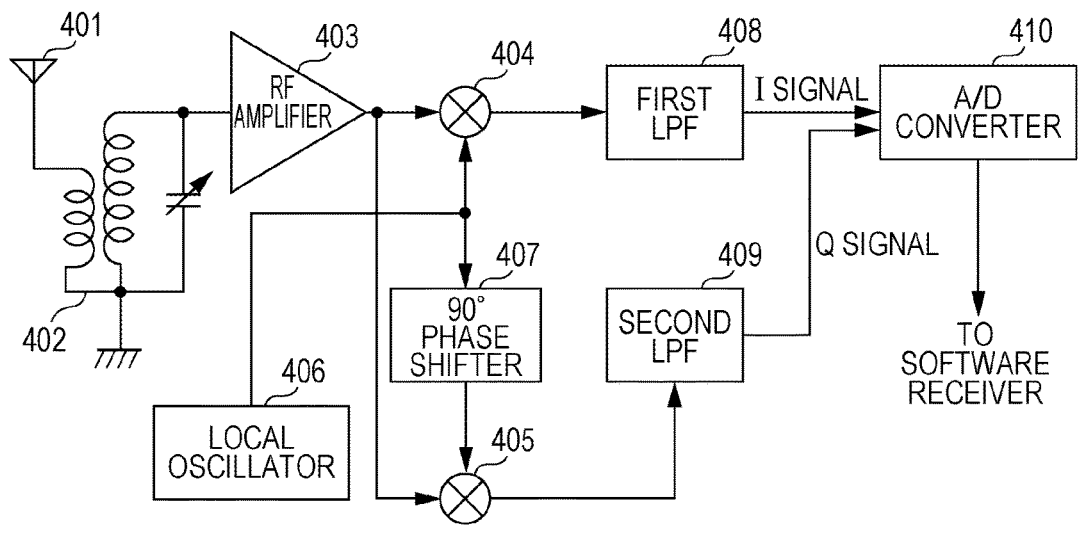
FIG. 4 is a block diagram of an IQ converter.

FIG. 4 is a block diagram of the IQ converter 105.

The IQ converter 105 extracts the radio wave received from an antenna 401 by a tuning circuit 402. Then, amplification is performed by an RF amplifier 403. A high frequency signal obtained by amplification in the RF amplifier 403 is input to a first mixer 404 and a second mixer 405. A local oscillation signal output from a local oscillator 406 is input to the first mixer 404. This local oscillation signal has a frequency slightly lower than that of the radio wave. A signal obtained by shifting a phase of the local oscillation signal by 90° by a 90° phase shifter 407 is input to the second mixer 405.

The first mixer 404 integrates a RF signal from the RF amplifier 403 and the local oscillation signal from the local oscillator 406. The first mixer 404 supplies a frequency signal of the frequency difference to a first low-pass filter (hereinafter referred to as "LPF") 408. Then, the first LPF 408 outputs an I signal obtained by subtracting, from the frequency of the radio wave received by the antenna 401, the frequency of the local oscillation signal transmitted from the local oscillator 406.

Similarly, the second mixer 405 integrates the RF signal from the RF amplifier 403 and the signal obtained by shifting the phase of the local oscillation signal by 90° by the phase shifter 407. The second mixer 405 supplies the frequency signal of the frequency difference to a second LPF 409. Then, the second LPF 409 outputs a Q signal obtained by subtracting, from the frequency of the radio wave received by the antenna 401, the frequency obtained by shifting the phase of the local oscillation signal by 90°.

That is, a well-known quadrature detection circuit (quadrature mixer) includes the local oscillator 406, the first mixer 404, the 90° phase shifter 407, the second mixer 405, the first LPF 408, and the second LPF 409.

The I signal and the Q signal are converted to digital data by an A/D converter 410 and then output to the software receiver 107.

The IQ converter 105 has a function of a down converter using the quadrature detection circuit and of A/D conversion by the A/D converter 410.

[Hardware Configuration of Software Receiver 107]

Figure 5:
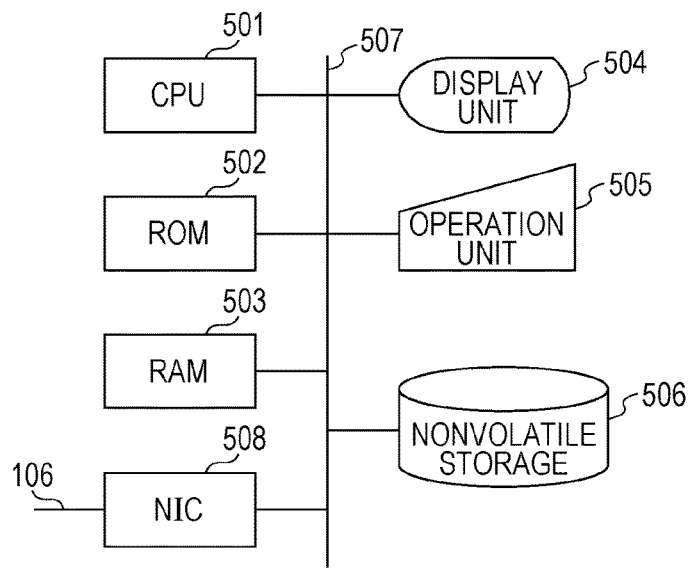
FIG. 5 is a block diagram showing a hardware configuration of a software receiver.

FIG. 5 is a block diagram showing a hardware configuration of the software receiver 107.

The software receiver 107 includes a well-known computer such as a personal computer. The software receiver 107 includes a CPU 501, a ROM 502, a RAM 503, a display unit 504, an operation unit 505, and a nonvolatile storage 506. These are connected to a bus 507. The display unit 504 includes a liquid crystal display and the like. The operation unit 505 includes a keyboard, a mouse and the like. The nonvolatile storage 506 includes a hard disk drive and the like. In addition to these, an NIC (network interface card) 508 for communication with the interrogator 103 and the IQ converter 105 is connected to the bus 507.

That is, the software receiver 107 is practically a general computer. The computer realizes a function as the software receiver 107 by executing a program stored in the nonvolatile storage 506.

[Software Function of Software Receiver 107]

Figure 6:
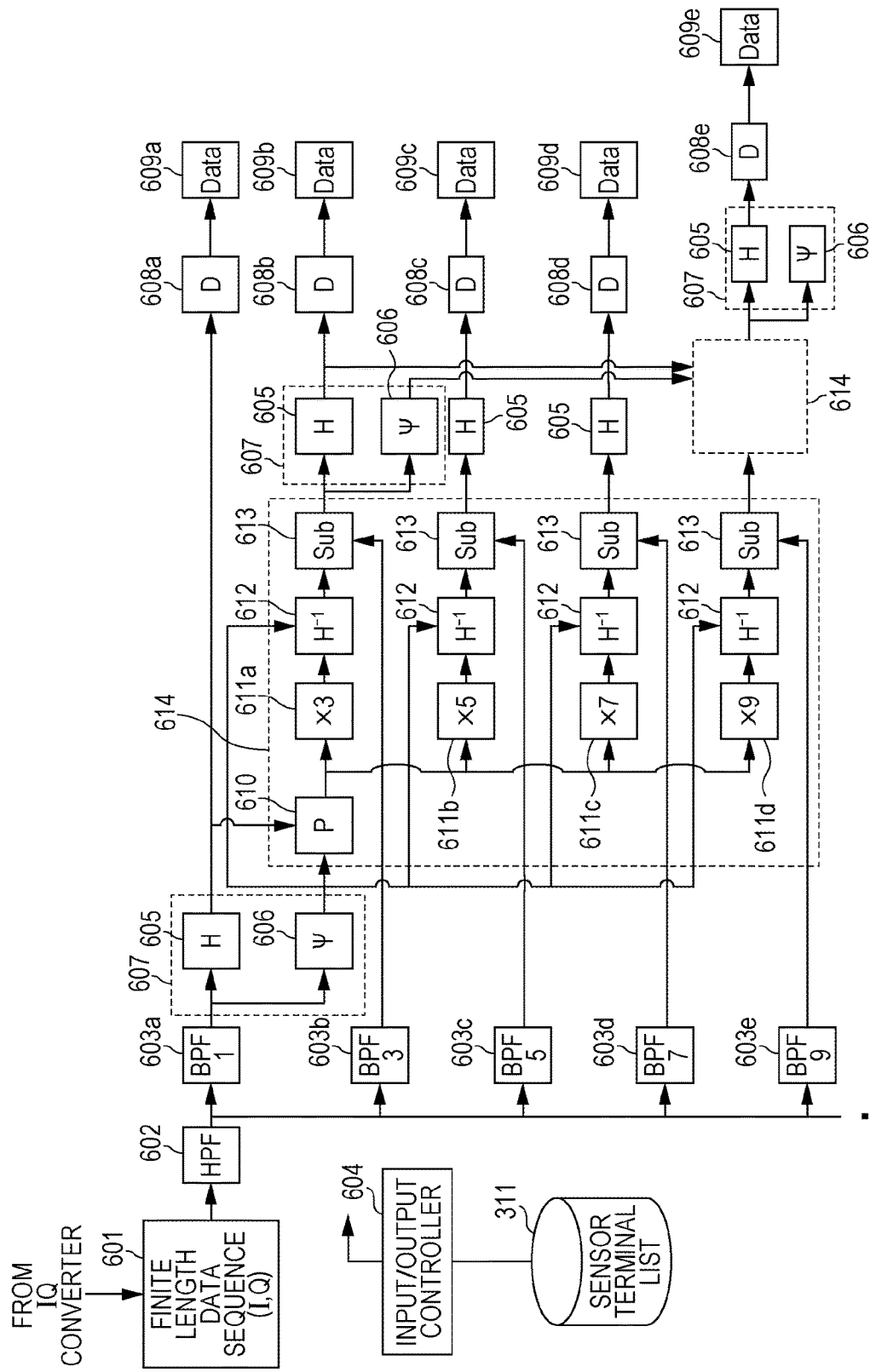
FIG. 6 is a block diagram showing a software function of the software receiver in a comprehensive manner.
Figure 7:
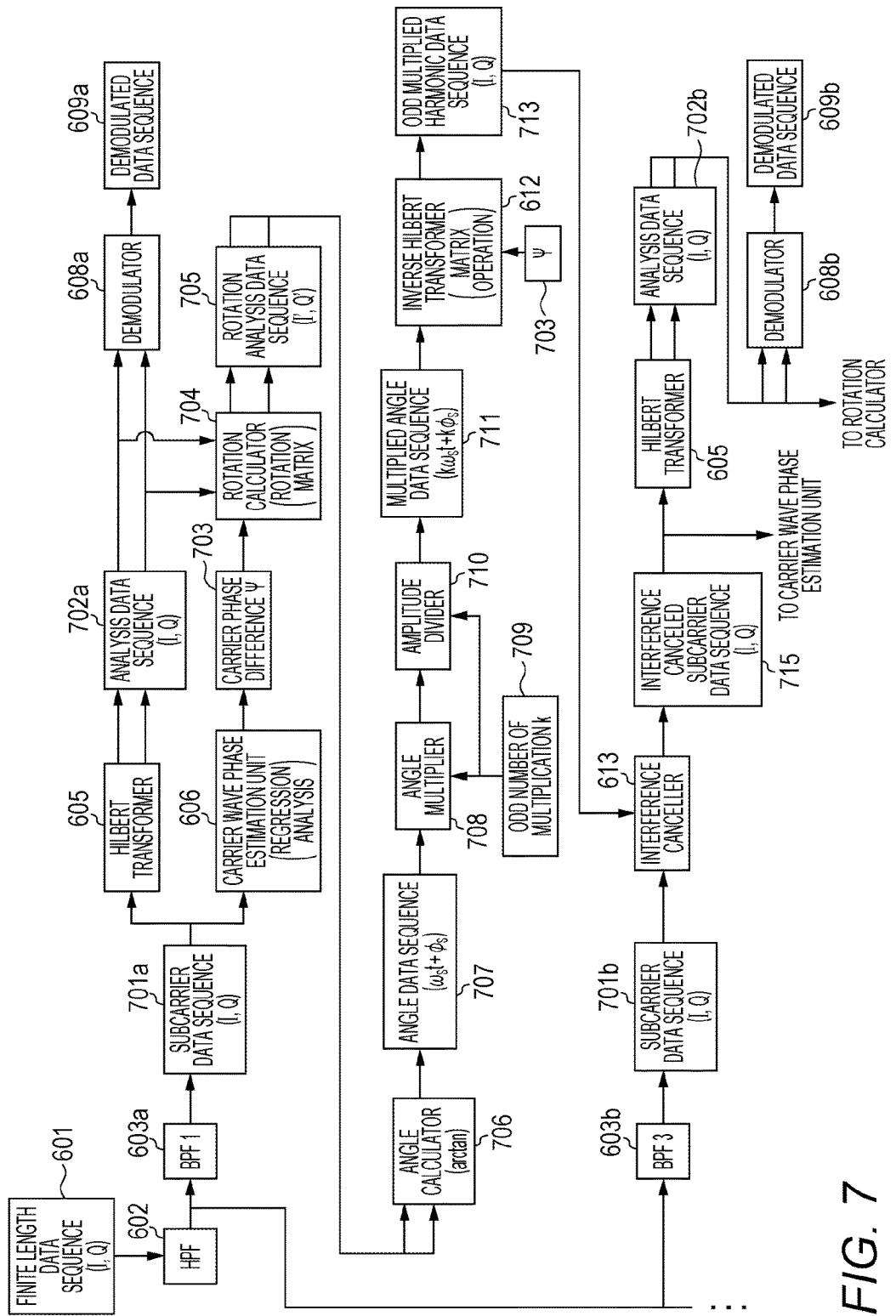
FIG. 7 is a block diagram showing the software function of the software receiver in more detail.

FIG. 6 is a block diagram showing a software function of the software receiver 107 in a comprehensive manner. FIG. 7 is a functional block diagram showing the software function of the software receiver 107 in more detail. FIG. 6 shows the software function in a comprehensive manner, whereas FIG. 7 explicitly shows a form of data generated in the process of FIG. 6.

Received data received from the IQ converter 105 includes the I data and the Q data. This received data is classified as a finite length data sequence 601 to be processed and temporarily stored in the RAM 503 (see FIG. 5).

At first, a DC offset component is removed by a high-pass filter (hereinafter referred to as an "HPF") 602 from the finite length data sequence 601 including the I data and the Q data.

Next, a subcarrier data sequence 701*a* including a target subcarrier wave component is taken out, by a bandpass filter (hereinafter referred to as a "BPF"), from the finite length data sequence 601 output from the HPF 602. A first BPF 603*a* (abbreviated as "BPF1" in FIG. 6) passes a frequency component which is one time the subcarrier wave from the finite length data sequence 601. A third BPF 603*b* (abbreviated as "BPF3" in FIG. 6) passes a frequency component which is three times the subcarrier wave from the finite length data sequence 601. A fifth BPF 603*c* (abbreviated as "BPF5" in FIG. 6) passes a frequency component which is five times the subcarrier wave from the finite length data sequence 601. A seventh BPF 603*d* (abbreviated as "BPF7" in FIG. 6) passes a frequency component which is seven times the subcarrier wave from the finite length data sequence 601. A ninth BPF 603*e* (abbreviated as "BPF9" in FIG. 6) passes a frequency component which is nine times the subcarrier wave from the finite length data sequence 601.

That is, the BPF in which a center frequency is a harmonic component (spurious) of an odd multiple of the subcarrier wave is provided by an input/output controller 604. Hereinafter, when the first BPF 603*a*, the third BPF 603*b*, the fifth BPF 603*c*, the seventh BPF 603*d*, and the ninth BPF 603*e* are not distinguished from each other, they are abbreviated as BPF 603.

For example, when the carrier wave frequency is 915 MHz and the subcarrier wave frequency is 20 kHz, the center frequency of the first BPF 603*a* is 915.02 MHz ($=915+0.02\times1$), the center frequency of the third BPF 603*b* is 915.06 MHz ($=915+0.02\times3$), the center frequency of the fifth BPF 603*c* is 915.10 MHz ($=915+0.02\times5$), the center frequency of the seventh BPF 603*d* is 915.14 MHz ($=915+0.02\times7$), and the ninth BPF 603*e* is 915.18 MHz ($=915+0.02\times9$).

Although description is omitted in FIG. 6 due to space limitations, the number of BPFs 603 also increases according to the number of sensor terminals 102.

The input/output controller 604 reads the sensor terminal list 311 described above. The sensor terminal list 311 stores the modulation method and the subcarrier wave frequency that are set for each sensor terminal 102, and the demodulation order determined based on an intensity of the received radio wave and on the subcarrier wave frequency. Then, the input/output controller 604 sets the BPF 603, the BPF 603 corresponding to the number of sensor terminals 102 described in the sensor terminal list 311 and the set subcarrier wave frequency.

Here, the interference components included in the radio wave received by the receiver 104 and the operation principle of successive interference cancellation will be described with reference to FIGS. 8 and 9.

The sensor terminal 102 superimposes the subcarrier wave preset by the interrogator 103 in the first step on the unmodulated wave transmitted by the interrogator 103 which is the unmodulated wave source in the second procedure. Here, the sensor terminal 102 to which the subcarrier wave having the lowest frequency, among the frequencies of the subcarrier waves uniquely assigned to the sensor terminals 102, is assigned is considered to be located closest to the receiver 104. This is because the radio wave based on the subcarrier wave having the lowest frequency is an interference radio wave which must be canceled first.

Figure 8:
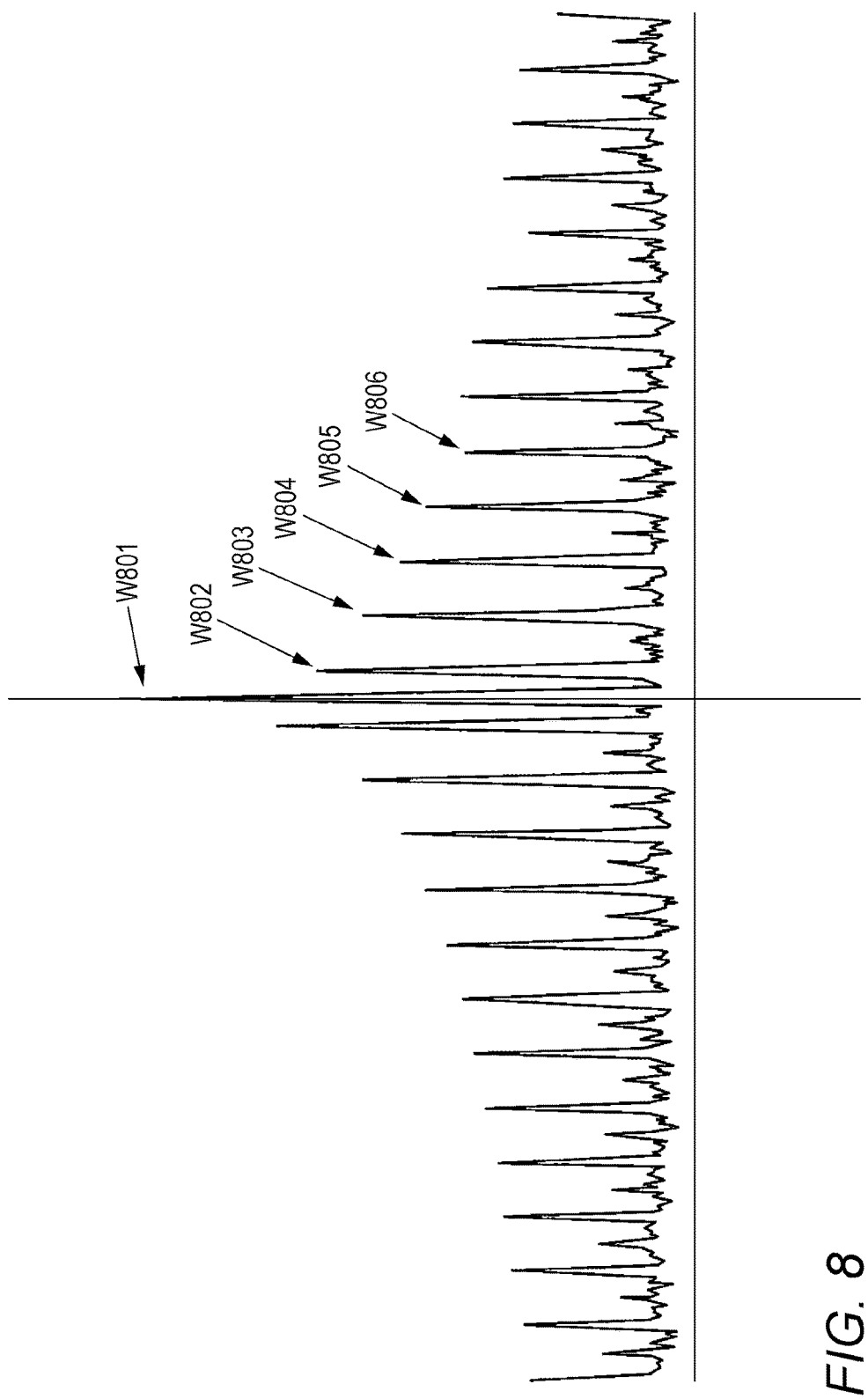
FIG. 8 is a graph of a frequency range obtained by applying a Fourier analysis to a radio wave transmitted from the sensor terminal.

FIG. 8 is a graph of a frequency range obtained by applying a Fourier analysis to radio waves transmitted from the sensor terminal 102. The horizontal axis indicates the frequency and the vertical axis indicates an intensity of the signal component. The frequency of the unmodulated wave, that is, the frequency of the carrier wave is 915 MHz and the subcarrier wave frequency is 20 kHz. Hereinafter, the lowest frequency among the subcarrier waves used by the sensor terminals 102 is referred to as the lowest subcarrier wave frequency. It should be noted that in the present embodiment, the lowest subcarrier wave frequency is set to 20 kHz in the following description.

Referring to the graph of FIG. 8, there is a component W802 of 915.02 MHz on immediate right of a component W801 of the carrier wave having a frequency of 915 MHz, the component W802 being obtained by superimposing the subcarrier wave. Further, extra harmonic components (spurious) obtained by multiplying, by an odd number, the 20 kHz subcarrier wave continue as a component W803 of 915.06 MHz, a component W804 of 915.10 MHz, a component W805 of 915.14 MHz, a component W806 of 915.18 MHz - - - on the right side of the subcarrier wave component and onward.

Figure 9:
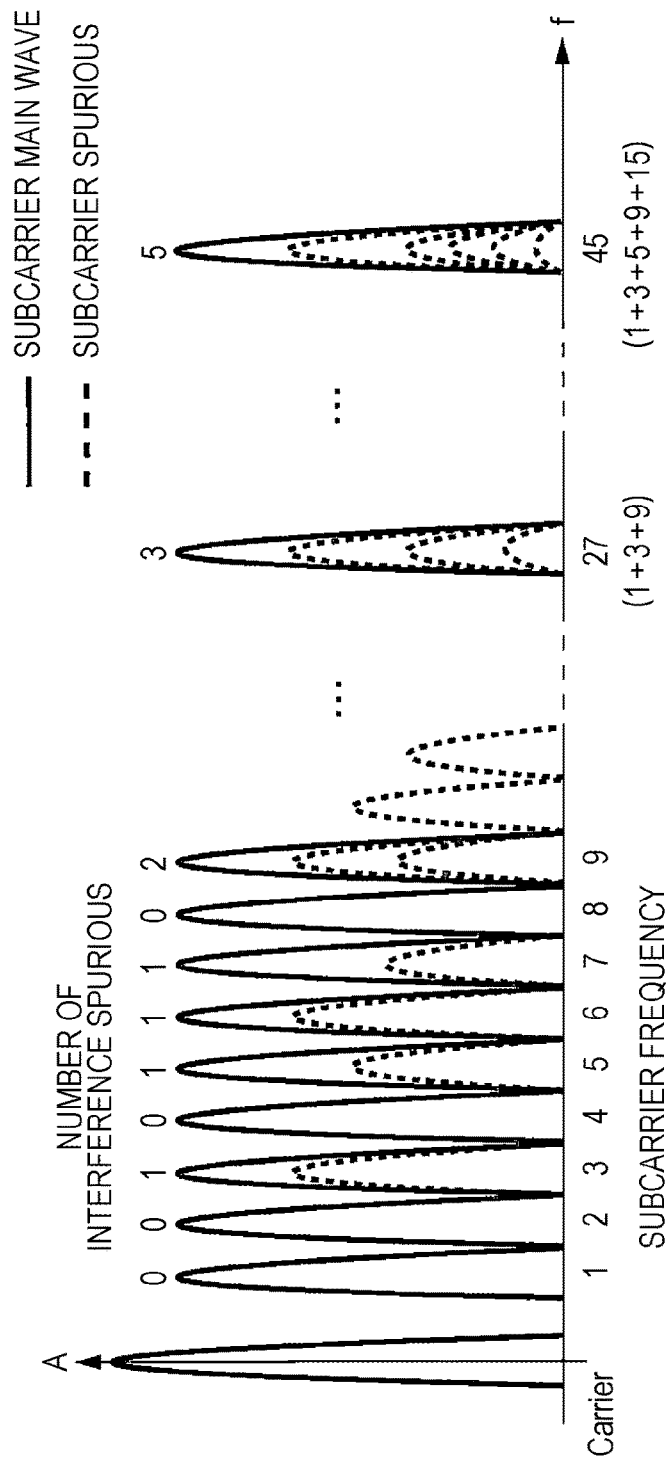
FIG. 9 is a schematic diagram for explaining spurious.

FIG. 9 is a schematic diagram for explaining spurious. This schematic diagram schematically shows components of the subcarrier wave in the graph of the frequency range obtained by applying Fourier analysis shown in FIG. 7 to the radio wave transmitted from the sensor terminal 102.

Numbers on the horizontal axis are numbers of multiplication of the subcarrier wave frequency. For example, when the lowest subcarrier wave frequency is 20 kHz, the subcarrier wave frequency is 20 kHz if the number of multiplication is 1, the subcarrier wave frequency is 40 kHz if the number of multiplication is 2, the subcarrier wave frequency is 60 kHz if the number of multiplication is 3, - - - . That is, the subcarrier wave frequency set to the sensor terminal 102 is the frequency obtained by multiplying the lowest subcarrier wave frequency by a natural number.

Further, numbers written at vertices of respective subcarrier wave frequency components indicate the number of spurious causing interference.

Phase modulation or frequency modulation is mainly used for the modulator 203, used in the present embodiment, of the sensor terminal 102. The modulation method of the modulator 203 is an odd function. Therefore, the subcarrier wave frequency multiplied by an odd number is a spurious component and is mixed into the signal of the received radio wave.

When the number of multiplication of the subcarrier wave frequency is 1, the number of interference spurious is zero. That is, this frequency is the subcarrier wave frequency itself.

When the number of multiplication of the subcarrier wave frequency is 2, the number of interference spurious is zero. Since this frequency is an even multiple of the subcarrier wave frequency, it is outside the scope of successive interference cancellation.

When the number of multiplication of the subcarrier wave frequency is 3, the spurious ($=1\times3$) with a number of multiplication of 1 for the subcarrier wave frequency interferes. Therefore, the number of interference spurious is one. Since this frequency is an odd multiple of the subcarrier wave frequency, it is an object of successive interference cancellation.

When the number of multiplication of the subcarrier wave frequency is 4, the number of interference spurious is zero. Since this frequency is an even multiple of the subcarrier wave frequency, it is outside the scope of successive interference cancellation.

When the number of multiplication of the subcarrier wave frequency is 5, the spurious ($=1\times5$) with a number of multiplication of 1 for the subcarrier wave frequency interferes. Therefore, the number of interference spurious is one. Since this frequency is an odd multiple of the subcarrier wave frequency, it is the object of successive interference cancellation.

When the number of multiplication of the subcarrier wave frequency is 6, the spurious with a number of multiplication of 1 for the subcarrier wave frequency interferes. Therefore, the number of interference spurious is one. This frequency is three times a doubled subcarrier wave frequency. However, since this frequency is an even multiple (six times) of the subcarrier wave frequency, it is outside the scope of successive interference cancellation.

When the number of multiplication of the subcarrier wave frequency is 7, the spurious ($=1\times7$) with a number of multiplication of 1 of the subcarrier wave frequency interferes. Therefore, the number of interference spurious is one. Since this frequency is an odd multiple of the subcarrier wave frequency, it is the object of successive interference cancellation.

When the number of multiplication of the subcarrier wave frequency is 8, the number of interference spurious is zero. Since this frequency is an even multiple of the subcarrier wave frequency, it is outside the scope of successive interference cancellation.

When the number of multiplication of the subcarrier wave frequency is 9, the spurious ($=1\times9$) with a number of multiplication of 1 of the subcarrier wave frequency and the spurious ($=3\times3$) with a number of multiplication of 3 of the subcarrier wave frequency interfere. Therefore, the number of interference spurious is two. Since this frequency is an odd multiple of the subcarrier wave frequency, it is the object of successive interference cancellation.

When the number of multiplication of the subcarrier wave frequency is 27, the spurious ($=1\times27$) with a number of multiplication of 1 of the subcarrier wave frequency, the spurious ($=3\times9$) with a number of multiplication of 3 of the subcarrier wave frequency, and the spurious ($=9\times3$) with a number of multiplication of 9 of the subcarrier wave frequency interfere. Therefore, the number of interference spurious is three.

When the number of multiplication of the subcarrier wave frequency is 45, the spurious ($=1\times45$) with a number of multiplication of 1 of the subcarrier wave frequency, the spurious ($3\times15$) with a number of multiplication of 3 of the subcarrier wave frequency, the spurious ($=5\times9$) with a number of multiplication of 5 of the subcarrier wave frequency, the spurious ($=9\times5$) with a number of multiplication of 9 of the subcarrier wave frequency, and the spurious ($=15\times3$) with a number of multiplication of 15 of the subcarrier wave frequency interfere. Therefore, the number of interference spurious is five.

In this manner, the radio wave emitted from the sensor terminal 102 to which the subcarrier wave has been set receives interference of the spurious due to the frequency obtained by multiplication by a smaller odd number, the subcarrier wave being obtained by setting the number of multiplication of the lowest subcarrier wave frequency to an odd number.

In the successive interference cancellation, the interference components are successively canceled from the finite length data sequence 601 including the interference components. An example of the successive interference cancellation procedure will be described below.

When the number of multiplication of the subcarrier wave frequency is 3, 5, or 7, the number of interference spurious is one. Therefore, interference signals obtained by multiplying the frequency of the signal of the lowest subcarrier wave frequency by 3, 5, and 7 are generated in a pseudo manner. Cancellation is performed by respectively subtracting the interference signals from the original signals.

When the number of multiplication of the subcarrier wave frequency is 9, the number of interference spurious is two. Therefore, at first, an interference signal obtained by multiplying the frequency of the signal of the lowest subcarrier wave frequency by 9 is generated in a pseudo manner. Cancellation is performed by subtracting this interference signal from the original signal. Further, an intermediate interference canceled signal is generated. Next, an interference signal obtained by tripling the frequency of the signal obtained by tripling the lowest subcarrier wave frequency is generated in a pseudo manner. Cancellation is performed by subtracting this interference signal from the intermediate interference canceled signal. In this manner, a final interference canceled signal is obtained.

When the low number of multiplication of the subcarrier wave frequency is 27, an interference signal obtained by multiplying the frequency of the lowest subcarrier wave frequency by 27 is generated in a pseudo manner. Similarly, cancellation from the original signal is performed. In this manner, a first interference canceled signal is generated. Next, an interference signal obtained by multiplying by 9 the frequency of the signal obtained by tripling the lowest subcarrier wave frequency is generated in a pseudo manner. Further, cancellation from the first interference canceled signal is performed. In this manner, a second interference canceled signal is generated. Next, an interference signal obtained by tripling the frequency of the signal obtained by multiplying the lowest subcarrier wave frequency by 9 is generated in a pseudo manner. Further, cancellation from the second interference canceled signal is performed. In this manner, the final interference canceled signal is obtained.

When the low number of multiplication of the subcarrier wave frequency is 45, an interference signal obtained by multiplying the frequency of the lowest subcarrier wave frequency by 45 is generated in a pseudo manner. Further, cancellation from the original signal is performed. In this manner, a first interference canceled signal is generated. Next, an interference signal obtained by multiplying by 15 the frequency of the signal obtained by tripling the lowest subcarrier wave frequency is generated in a pseudo manner. Further, cancellation from the first interference canceled signal is performed. In this manner, a second interference canceled signal is generated. Next, an interference signal obtained by multiplying by 9 the frequency of the signal obtained by multiplying the lowest subcarrier wave frequency by 5 is generated in a pseudo manner. Further, cancellation from the second interference canceled signal is performed. In this manner, a third interference canceled signal is obtained.

Next, an interference signal obtained by multiplying by 5 the frequency of the signal obtained by multiplying the lowest subcarrier wave frequency by 9 is generated in a pseudo manner. Further, cancellation from the third interference canceled signal is performed. In this manner, a fourth interference canceled signal is obtained. Next, an interference signal obtained by tripling the frequency of the signal obtained by multiplying the lowest subcarrier wave frequency by 15 is generated in a pseudo manner. Further, cancellation from the fourth interference canceled signal is performed. In this manner, the final interference canceled signal is obtained.

That is, the successive interference cancellation is performed for data of the subcarrier wave to be demodulated, in order of an odd multiple of the lowest subcarrier wave frequency, an odd multiple of the lowest subcarrier wave frequency multiplied by the odd number, - - -, that is, cancellation is performed in order from the lowest frequency component to higher frequency components among the interference components having a lower frequency than the frequency of the subcarrier wave to be demodulated.

Returning again to FIGS. 6 and 7, description of the block diagram will be continued. It should be noted that FIG. 6 is a diagram showing a software function in a comprehensive manner. FIG. 7 explicitly shows a signal form in the process of FIG. 6. That is, both are block diagrams showing the same function. Therefore, description will be given below together without separating FIG. 6 and FIG. 7.

The first BPF 603a is provided, as a first stage of the successive interference cancellation described above, to obtain the subcarrier data sequence 701a obtained by extracting only the target subcarrier wave component from the finite length data sequence 601.

As shown in FIGS. 6 and 7, the subcarrier data sequence 701a output from the first BPF 603a is supplied to an analysis data converter 607, the analysis data converter 607 including a Hilbert transformer 605 and a carrier wave phase estimation unit 606. In FIG. 6, the Hilbert transformer 605 is abbreviated as "H" and the carrier wave phase estimation unit 606 is abbreviated as "Ψ" due to space limitations.

The Hilbert transformer 605 performs a well-known Hilbert transform operation process on the subcarrier data sequence 701a including the I data and the Q data of the subcarrier wave component. Consequently, conversion to an analysis data sequence 702a having the I data and the Q data is performed.

The carrier wave phase estimation unit 606 performs regression analysis using a well-known recursive least squares method on the subcarrier data sequence 701a including the I data and the Q data of the subcarrier wave component. Thus, the carrier wave phase estimation unit 606 estimates a carrier phase difference Ψ703 which is a phase delay of the carrier wave. The phase delay of the carrier wave is a phase delay occurring in the carrier wave component of the radio wave transmitted from the interrogator 103, reflected by the sensor terminal 102, and further received by the receiver 104. That is, this phase delay depends on a path length when the radio wave reaches the receiver 104 from the interrogator 103 through the sensor terminal 102.

The analysis data sequence 702a output from the Hilbert transformer 605 and having the I data and the Q data is supplied to a demodulator 608a.

In FIG. 6, demodulation processing corresponding to the first BPF 603a, the demodulation processing corresponding to the third BPF 603b, demodulation processing corresponding to the fifth BPF 603c, demodulation processing corresponding to the seventh BPF 603d, and demodulation processing corresponding to the ninth BPF 603e are respectively performed by the demodulator 608a, a demodulator 608b, a demodulator 608c, a demodulator 608d, and a demodulator 608e. Hereinafter, when the demodulators 608a, 608b, 608c, 608d, and 608e are not distinguished from each other, they are referred to as demodulator 608.

The demodulator 608a performs, on the analysis data sequence 702a, demodulation processing corresponding to the modulation method applied to the subcarrier wave, to generate a demodulated data sequence 609a. This demodulated data sequence 609a is a sensor signal component appearing on the lowest subcarrier wave frequency without successive interference cancellation.

Then, the analysis data sequence 702a is also supplied to a rotation calculator 704 together with the carrier phase difference Ψ703 output from the carrier wave phase estimation unit 606. Blocks after the rotation calculator 704 indicate a flow of data supplied to the successive interference cancellation.

Here, in FIG. 6, there are also a demodulated data sequence 609b output from the demodulator 608b, a demodulated data sequence 609c output from the demodulator 608c, a demodulated data sequence 609d output from the demodulator 608d, and a demodulated data sequence 609e output from the demodulator 608e. When the demodulated data sequence 609a, the demodulated data sequence 609b, the demodulated data sequence 609c, the demodulated data sequence 609d, and the demodulated data sequence 609e are not particularly distinguished from each other, they are referred to as demodulated data sequence 609.

The rotation calculator 704 executes a matrix operation of returning the phase of the analysis data sequence 702a by the carrier phase difference Ψ703 as a well-known matrix operation using a rotation matrix. That is, the rotation calculator 704 returns the carrier phase difference Ψ703 included in the analysis data sequence 702a, so as to output a rotation analysis data sequence 705 obtained by eliminating a phase delay of the analysis data sequence 702a. This rotation analysis data sequence 705 includes I' data and Q' data.

The rotation analysis data sequence 705 is supplied to an angle calculator 706. The angle calculator 706 executes a well-known matrix operation including arctangent, to output an angle data sequence 707 formed of $\omega_s t + \phi s$. $\omega_s$ indicates an angular velocity, and $\phi$, indicates a phase shift of the subcarrier wave.

The rotation calculator 704 and the angle calculator 706 shown in FIG. 7 described above correspond to the PLL processor 610 in FIG. 6. The PLL processor 610 is abbreviated as "P" in FIG. 6 due to space limitations.

The angle data sequence 707 is supplied to an angle multiplier 708. The angle multiplier 708 multiplies the angle data sequence 707 by an odd number of multiplication k709. This odd number of multiplication k709 is a number of multiplication for performing successive interference cancellation and is an odd number of 3 or more.

Amplitude of the data sequence output from the angle multiplier 708 is multiplied by the odd number of multiplication k709. Therefore, an amplitude divider 710 divides the amplitude of the data sequence by the odd number of multiplication k709, to calculate an amplitude adjustment value for the harmonic. In this manner, the amplitude divider 710 outputs a multiplied angle data sequence 711 formed of $k\omega_s t + k\phi_s$.

As described above, the angle multiplier 708 and the amplitude divider 710 shown in FIG. 7 correspond to angle multiplication processors 611a, 611b, 611c, and 611d in FIG. 6. These angle multiplication processors 611a, 611b, 611c, and 611d have simply different odd number of multiplications k709, and processing contents of the angle multiplier 708 and of the amplitude divider 710 are the same.

When the angle multiplication processors 611a, 611b, 611c, and 611d are not distinguished from each other, they are referred to as an angle multiplication processor 611.

The multiplied angle data sequence 711 and the carrier phase difference Ψ703 of the carrier wave are supplied to an inverse Hilbert transformer 612. The inverse Hilbert transformer 612 performs projective transformation in a zero crossing angular direction by the carrier phase difference Ψ703, based on the multiplied angle data sequence 711 obtained by applying the amplitude adjustment value, to generate an odd multiplied harmonic data sequence 713. That is, the inverse Hilbert transformer 612 obtains a data sequence having a frequency of k times the basic subcarrier data sequence 701a and including the carrier wave delayed by the carrier phase difference Ψ703 similarly to the subcarrier data sequence 701a. This odd multiplied harmonic data sequence 713 is supplied to an interference canceller 613 as an interference component to be canceled from the subcarrier data sequence 701 including the subcarrier wave having a frequency of k times the subcarrier data sequence 701a.

Meanwhile, the third BPF 603b outputs the subcarrier data sequence 701b including subcarrier wave including a frequency of k times (three times in the case of FIG. 7) the basic subcarrier data sequence 701a as a target subcarrier wave component from the finite length data sequence 601 output from the HPF 602. However, this subcarrier data sequence 701b includes the interference components. The interference canceller 613 performs cancellation by subtracting the odd multiplied harmonic data sequence 713, as the interference component, from the subcarrier data sequence 701b, the odd multiplied harmonic data sequence 713 having been output from the inverse Hilbert transformer 612. Further, the interference canceller 613 outputs an interference canceled subcarrier data sequence 715.

The interference canceled subcarrier data sequence 715 is supplied to the Hilbert transformer 605. The Hilbert transformer 605 performs a Hilbert transform operation on the interference canceled subcarrier data sequence 715, to generate an analysis data sequence 702b. The analysis data sequence 702b is supplied to the demodulator 608. The demodulator 608 performs demodulation processing on the analysis data sequence 702b, to generate the demodulated data sequence 609b.

Meanwhile, the interference canceled subcarrier data sequence 715 is also supplied to the carrier wave phase estimation unit 606. The analysis data sequence 702b is also supplied to the rotation calculator 704.

The PLL processor 610, the angle multiplication processor 611, the inverse Hilbert transformer 612, and the interference canceller 613 are included in an interference cancellation calculator 614. Here, the PLL processor 610 includes the rotation calculator 704 and the angle calculator 706. The angle multiplication processor 611 includes an angle multiplier 708 and the amplitude divider 710.

Although not shown in FIG. 6 due to space limitations, an odd number for generating odd multiplied harmonic data sequence 713 is set to the odd number of multiplication k709. For example, when the subcarrier wave frequency of the subcarrier data sequence 701 applied to the interference cancellation is three times the basic subcarrier wave, three is set to the odd number of multiplication k709. Similarly, when the subcarrier wave frequency of the subcarrier data sequence 701 applied to the interference cancellation is five times the basic subcarrier wave, five is set to the odd number of multiplication k709, and when the subcarrier wave frequency of the subcarrier data sequence 701 applied to the interference cancellation is seven times the base subcarrier wave, seven is set to the odd number of multiplication k709.

As described above, the interference component included in the subcarrier data sequence 701 is not limited to only one. For example, the subcarrier data sequence 701 having a subcarrier wave frequency of nine times the basic subcarrier wave includes two interference components, the interference component including a harmonic of nine times the basic subcarrier wave and the interference component including a harmonic of three times the subcarrier wave having a frequency of three times the frequency of the basic subcarrier wave.

When the basic subcarrier wave is 20 kHz, the subcarrier data sequence 701 having a 180 kHz (=20 kHzx9) subcarrier wave includes the interference component including a harmonic of nine times 20 kHz and the interference component including a harmonic of three times 60 kHz (=20 kHzx3).

The interference components remaining even by passing once through the interference canceller 613 pass through the interference cancellation calculator 614 twice or three times, so that the interference components are canceled. In this manner, the demodulator 608 obtains the demodulated data sequence.

A Hilbert transformer 605 and the carrier wave phase estimation unit 606 are provided side by side for the subcarrier data sequence 701 which is required to generate the interference components. Therefore, different carrier phase differences Ψ703 are estimated respectively for the subcarrier data sequences 701, that is, for the sensor terminals 102.

The input/output controller 604 reads the sensor terminal list 311. Further, the input/output controller 604 sets the BPF 603 corresponding to the number of sensor terminals 102 described in the sensor terminal list 311 and the subcarrier wave frequency set for the sensor terminal list 311. Then, the analysis data converter 607 and the interference cancellation calculator 614 are configured to correspond to the BPF 603. In particular, the odd number of multiplication k709 set in the interference cancellation calculator 614 has a close relationship with the center frequency of the BPF 603.

Although not shown in FIG. 6 due to space limitations, the actual software receiver 107 further includes the BPF 603 selectively passing frequency components of even multiples of the subcarrier wave, and the interference cancellation calculator 614.

Figure 10:
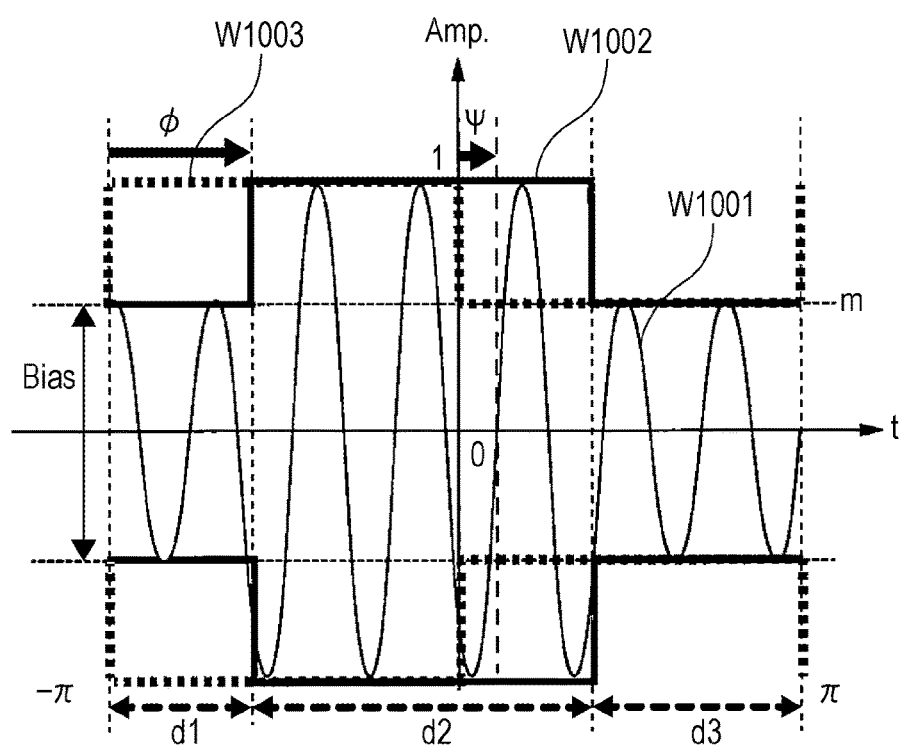
FIG. 10 is a graph schematically showing a waveform of the radio wave transmitted from the sensor terminal.

FIG. 10 is a graph schematically showing a waveform of the radio wave transmitted from the sensor terminal 102. The horizontal axis indicates time and the vertical axis indicates signal intensity.

As shown in FIG. 10, a carrier wave W1001 alternately has a time zone of large amplitude and a time zone of small amplitude. The carrier wave W1001 forms a square wave envelope. This square wave envelope is a subcarrier wave W1002. That is, by periodically switching the SPDT switch 204 by the subcarrier wave source 206 of the sensor terminal 102, the square wave envelope corresponding to an amplitude of the carrier wave W1001 is formed. This is the subcarrier wave W1002.

When this square wave envelope moves back and forth on the time axis, that is, in the horizontal axis direction, it means phase modulation. This is φ in FIG. 10.

When the carrier wave W1001 transmitted from the interrogator 103 is reflected by the sensor terminal 102 and reaches the receiver 104, a phase delay of the carrier wave W1001 occurs depending on a length of this path. This phase delay is Ψ in FIG. 10, that is, the carrier phase difference Ψ703 shown in FIG. 7.

Figure 11:
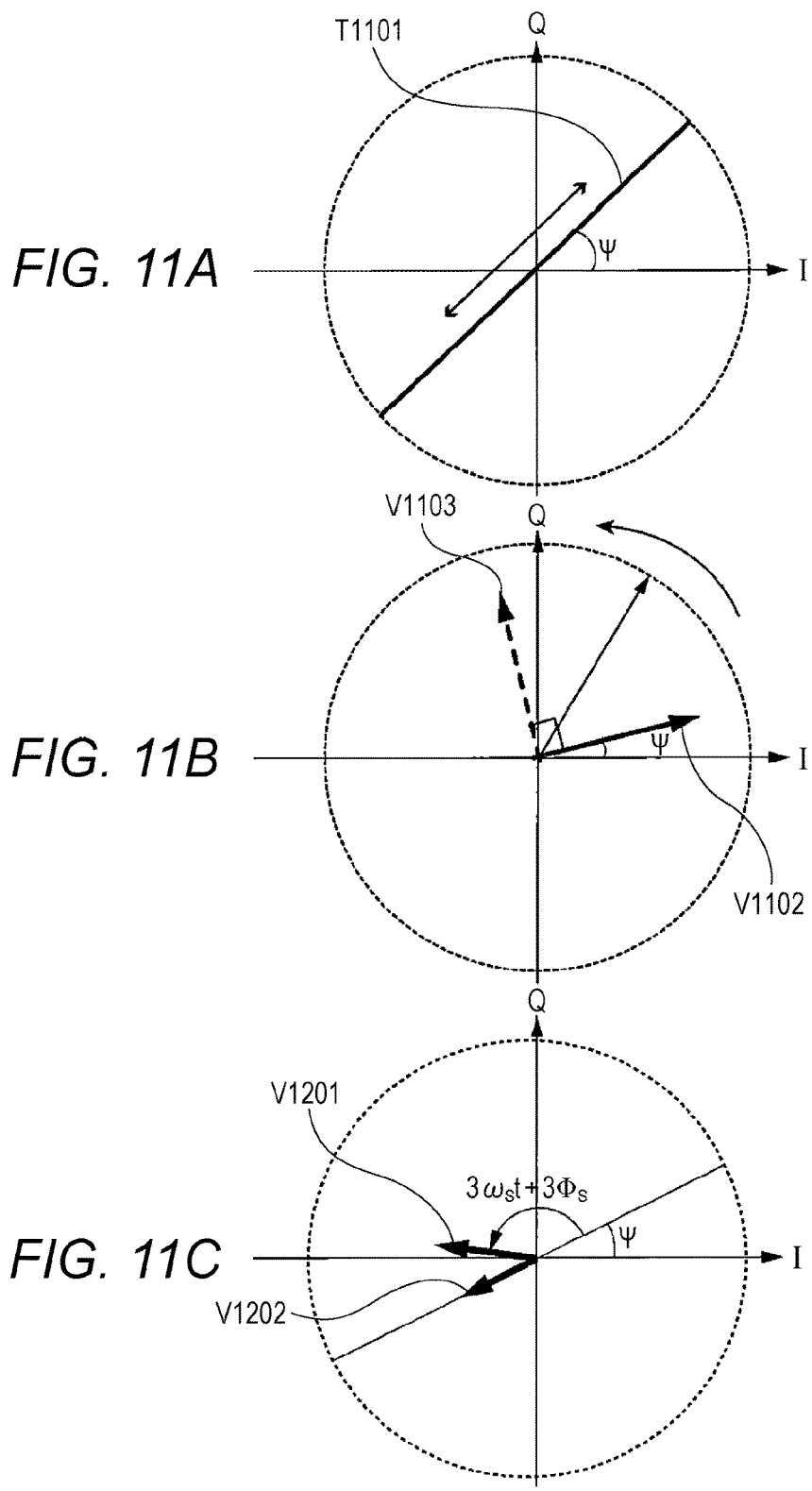
FIG. 11 is an IQ plane view of a radio wave received by a receiver, that is, of a subcarrier data sequence, an IQ plane view of an analysis data sequence obtained by performing a Hilbert transform on a subcarrier data sequence with a carrier phase difference $\Psi$ taken into consideration, and an IQ plane view showing a multiplied angle data sequence obtained by tripling a frequency of the analysis data sequence and an odd multiplied harmonic data sequence obtained by performing an inverse Hilbert transform on the multiplied angle data sequence.

FIG. 11A is an IQ plane view of the radio wave received by the receiver 104, that is, of the subcarrier data sequence 701. When phase modulation or frequency modulation is developed on the IQ plane, a linear trajectory passing through the center of the IQ plane like a diameter of a circle is drawn as shown in FIG. 11A. A radio wave signal goes back and forth along this straight line as time goes. A phase angle when the radio wave signal goes back and forth along this straight line is $\omega_s t + \phi_s$. Inclination of this straight line is the carrier phase difference Ψ703 which is the phase delay of the carrier wave.

FIG. 11B is an IQ plane view of an analysis data sequence 702 obtained by performing a Hilbert transform on the subcarrier data sequence 701 with the carrier phase difference Ψ 703 taken into consideration.

In the linear trajectory as shown in FIG. 11A, it is difficult to perform arithmetic processing to multiply the angle by an odd number. Therefore, the linear trajectory is transformed into a rotation trajectory by providing a component orthogonal to the linear trajectory in a pseudo manner. This is the Hilbert transform.

FIG. 11C is an IQ plane view showing the multiplied angle data sequence 711 and the odd multiplied harmonic data sequence 713. Here, the multiplied angle data sequence 711 is obtained by tripling the frequency of the analysis data sequence 702 in FIG. 11B. The odd multiplied harmonic data sequence 713 is obtained by performing an inverse Hilbert transform on the multiplied angle data sequence 711. For simplicity of explanation, it is assumed that the odd number of multiplication k709 is 3 in FIG. 11C.

In FIG. 11B, when the subcarrier data sequence 701 is transformed into the analysis data sequence 702 indicating the rotation trajectory, the angle can be clearly determined due to presence of an I component and a Q component. Therefore, it is possible to obtain the multiplied angle data sequence 711 by multiplying the angle by an odd number. This is a function of the angle multiplier 708.

The multiplied angle data sequence 711 is a data sequence based on the Hilbert transform similar to the analysis data sequence 702. Therefore, the multiplied angle data sequence 711 includes a pseudo orthogonal component which does not exist in an original subcarrier data sequence 701 (V1201). Therefore, by returning the multiplied angle data sequence 711 to a mapped image on the straight line by the inverse Hilbert transformer 612, it is possible to generate the interference component which is the odd multiplied harmonic data sequence 713 including a frequency of odd multiple of the subcarrier wave frequency (V1202).

Figure 12:
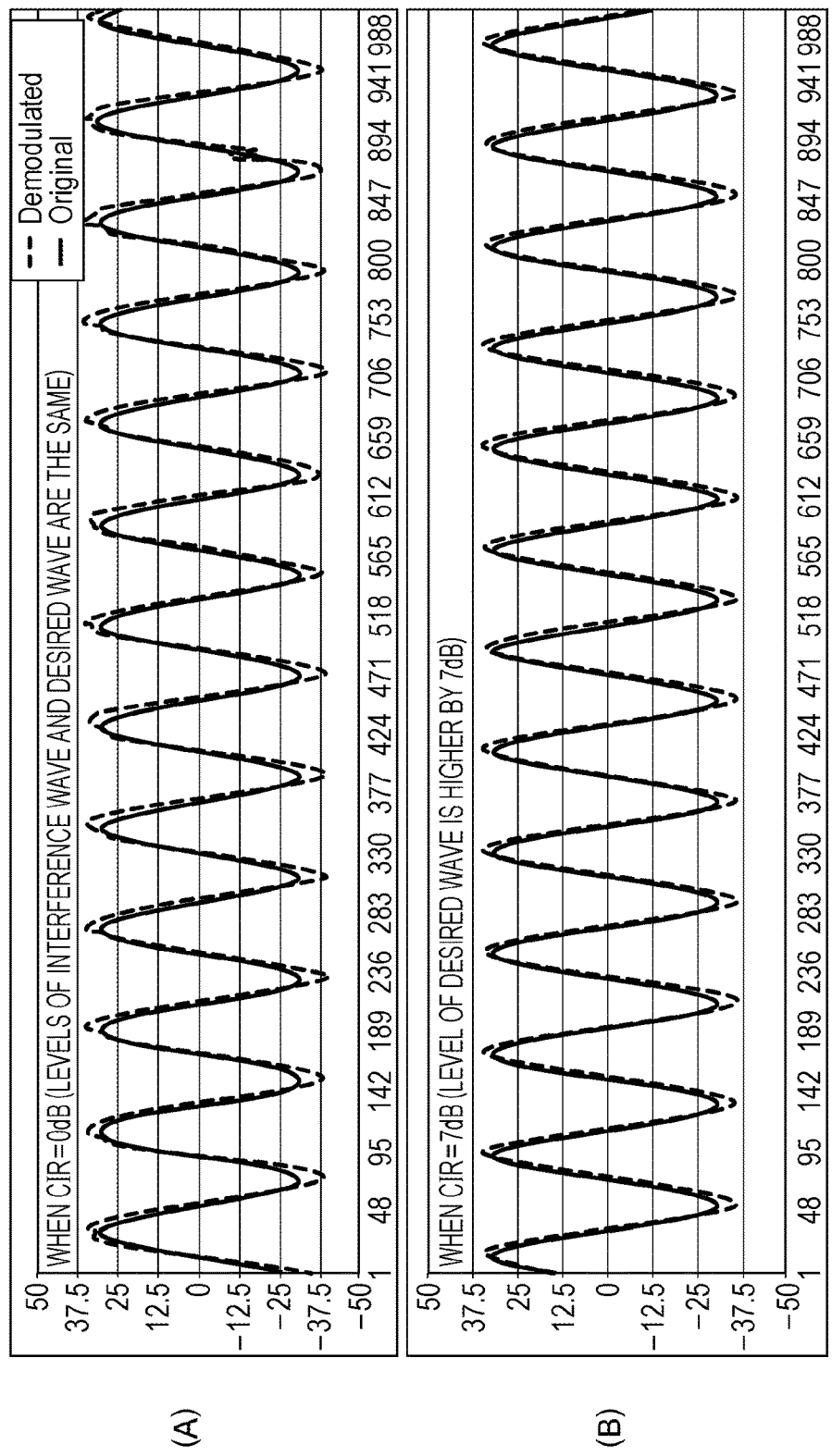
FIG. 12 is a waveform graph showing a comparison between a demodulation method according to the present embodiment and an original signal by manufacturing an experimental sensor terminal and performing demodulation processing.

FIG. 12 is a waveform graph showing a comparison between a demodulation method according to the present embodiment and an original signal by manufacturing an experimental sensor terminal and performing demodulation processing. In an experiment, a pseudo radio wave propagation environment was created with a printed circuit board instead of a space, and the sensor terminal 102 was mounted on the board. The modulation method of the sensor terminal 102 is phase modulation. The vertical axis indicates signal intensity and the horizontal axis indicates time.

In FIG. 12, the waveform graph shown in (A) is a graph when a CIR (carrier wave-to-interference ratio)=0 dB. The waveform graph shown in (B) of FIG. 12 is a graph when CIR=7 dB.

As shown in (A) of FIG. 12, when signal levels of an interference wave and a desired wave are the same, it can be understood that a waveform generally close to an original waveform is obtained although a received signal waveform is slightly disturbed.

Essentially, in phase modulation and frequency modulation, when the level of the interference signal approaches the level of the desired signal, the desired signal is drowned out by a well-known masking phenomenon. Therefore, the demodulation is impossible. However, at CIR=0 dB where the demodulation would not be performed at all due to the interference signal, generally good demodulation can be realized. In view of this, it can be understood that the successive interference cancellation according to the present embodiment accurately cancels the interference components.

As shown in (B) of FIG. 12, when the signal levels of the interference wave and the desired wave are 7 dB, it can be understood that no disturbance is observed in the received signal waveform at all, and that almost the same waveform as the original waveform can be obtained except for a difference in amplitude.

Figure 13:
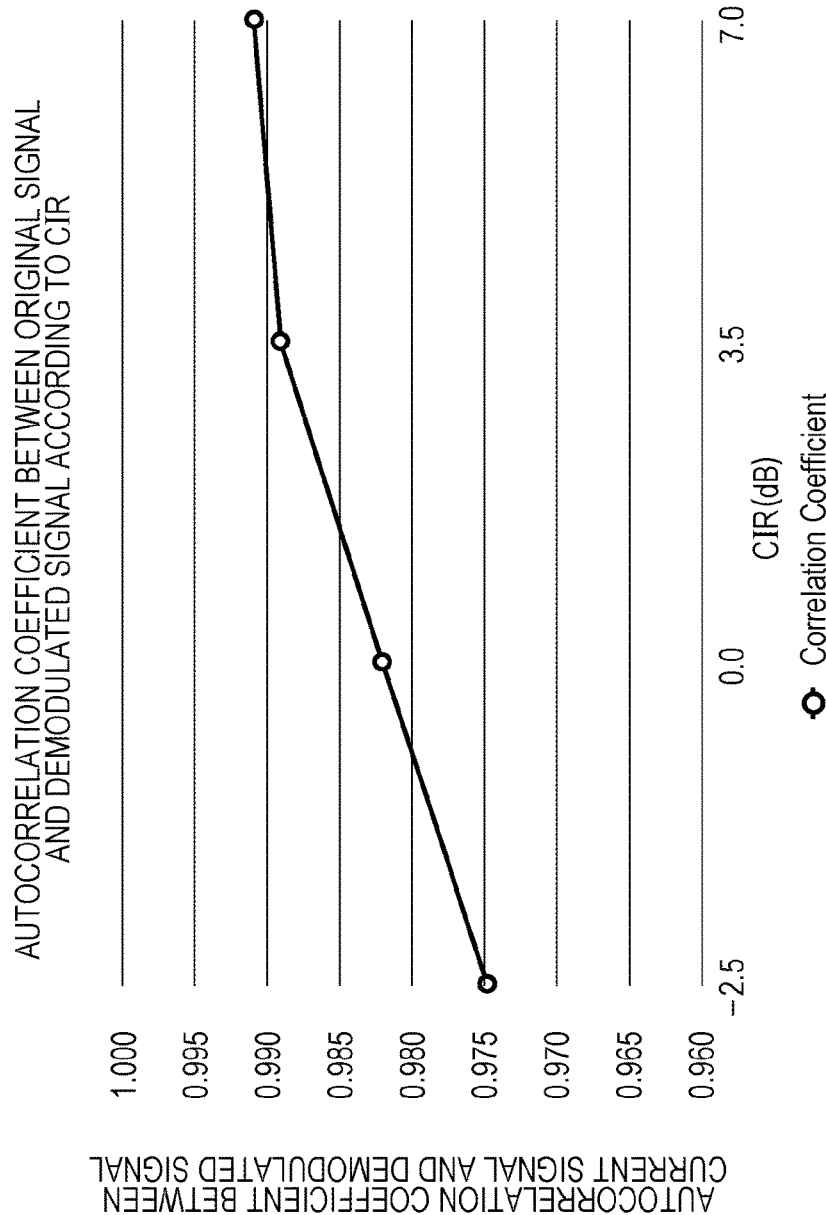
FIG. 13 is a graph in which an autocorrelation coefficient between the original signal and a demodulated signal is calculated, when comparing the original signal and the demodulation method according to the present embodiment by performing demodulation processing with the same experimental sensor terminal as the experimental sensor terminal in FIG. 12.

FIG. 13 is a graph in which an autocorrelation coefficient between the original signal and a demodulated signal is calculated, when comparing the original signal and the demodulation method according to the present embodiment by performing demodulation processing with the same experimental sensor terminal as the experimental sensor terminal in FIG. 12. The vertical axis indicates the autocorrelation coefficient and the horizontal axis indicates the CIR.

As in (A) of FIG. 12, even when CIR=0 dB, demodulation accuracy shows a high value of 0.982. When a disturbance component of the demodulated signal is sufficiently higher than the frequency of the signal output from the acceleration sensor, it is possible to cancel the disturbance component of the signal by a simple LPF. Therefore, a practical measurement system can be realized.

As can be seen from the above description, the harmonic component in the MSMA is generated at a frequency which is an odd multiple of a fundamental frequency. This is due to mathematical properties. In view of this, the interference component, of each channel, including harmonic components will be studied. In this case, since harmonics of odd channel subcarrier waves are obtained by multiplying odd numbers by odd numbers, they are always generated only in odd channels. Similarly, since harmonics of even channel subcarrier waves are obtained by multiplying even numbers by even numbers, they are always generated only in even channels. When this property is used, it is possible to improve computational efficiency of the software receiver by parallelizing receiving processes.

Figure 14:
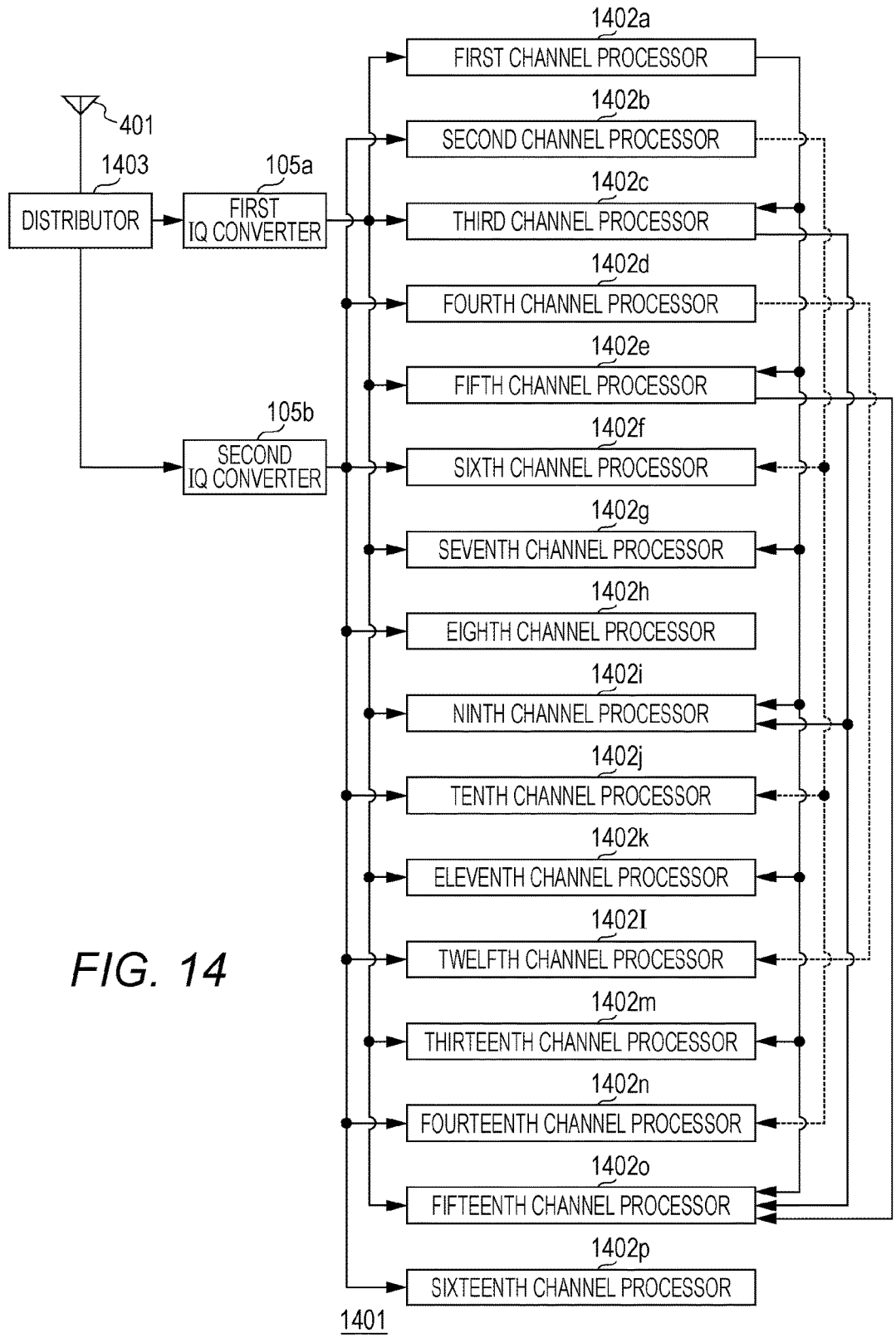
FIG. 14 is a block diagram showing a modification of the software receiver.

FIG. 14 is a block diagram showing a modification of a software receiver 1401.

In FIG. 14, a first channel processor 1402a has a BPF which passes a fundamental wave (first harmonic) as the carrier wave, and performs signal processing on the subcarrier wave including the first harmonic.

A second channel processor 1402b has a BPF which passes a frequency twice the fundamental wave (second harmonic) as the carrier wave, and performs signal processing on the subcarrier wave including the second harmonic.

A third channel processor 1402c has a BPF which passes a frequency three times the fundamental wave (third harmonic) as the carrier wave, and performs signal processing on the subcarrier wave including the third harmonic.

Likewise, a sixteenth channel processor 1402p has a BPF which passes a frequency 16 times the fundamental wave (16th harmonic) as the carrier wave, and performs signal processing on the subcarrier wave including the 16th harmonic.

Signal processing of each channel includes the carrier wave phase estimation unit 606, the angle calculator 706, the Hilbert transformer 605, and the interference canceller 613 described in FIGS. 6 and 7.

In FIG. 14, the interference component generated from the channel processor of each channel is indicated by a line having an arrow extending from the right side of each channel processor.

As can be seen from FIG. 14, the interference components generated from the first channel processor 1402a include 1×3=3 times, 1×5=5 times, 1×7=7 times, 1×9=9 times, 1×11=11 times, 1×13=13 times, 1×15=15 times - - - .

The interference components generated from the second channel processor 1402b include 2×3=6 times, 2×5=10 times, 2×7=14 times - - - .

The interference components generated from the third channel processor 1402c include 3×3=9 times, 3×5=15 times - - - .

The interference components generated from a fourth channel processor 1402d includes 4×3=12 times - - - .

The interference components generated from a fifth channel processor 1402e includes 5×3=15 times - - - .

In view of this, it can be understood that the channel processor of the odd channel and the channel processor of the even channel can be completely separated.

Then, the radio wave received from the antenna 401 is distributed to two systems by a distributor 1403. One is supplied to a first IQ converter 105a as a signal path for odd channels and the other is supplied to a second IQ converter 105b as a signal path for even channels. The first IQ converter 105a and the second IQ converter 105b have the same configuration and the same function as the IQ converter 105 of FIG. 1.

The channel processor of the odd channel and the channel processor of the even channel are independent from each other. Therefore, independent processing can be performed in two software radio apparatuses and PCs or multi-CPU computers. In addition, one of prepared two computers operates as the channel processor of the odd channel and the other operates as the channel processor of the even channel, so that computer load is distributed to them. Therefore, calculation speed can be improved.

As described above, in the software receiver according to the embodiment of the present invention, when the channel is calibrated by arranging two or more BPFs while detuning the carrier wave by an integral multiple of the basic bandwidth, it is possible to divide this channel into an odd channel group and an even channel group when counted from a channel close to the carrier wave. Then, the carrier wave phase estimation unit 606, the angle calculator 706, the Hilbert transformer 605, and the interference canceller 613 can be each independently processed in the odd channel group and the even channel group.

It should be noted that as a method for distributing the signals to the odd channel group and the even channel group, a method of providing two HPFs 602, which are in an output stage of the IQ converter 105, in parallel can also be employed in addition to a method using the distributor 1403.

A demonstration experiment of the MSMA according to the present invention was carried out.

In the demonstration experiment, application to fault diagnosis of a structure is assumed, and a sensor capable of superimposing data on the subcarrier according to mechanism of the MSMA was used. This sensor can be obtained by modifying a battery-operated existing product. It should be noted that fault diagnosis of the structure is a main application example of the MSMA according to the present invention.

A forced vibration of 100 Hz is given to the structure by a vibration tester. Sensors are attached to three points of this structure. Acceleration data, at the three points, received from the sensors are simultaneously streamed by wired connection using SMA cable and by wireless connection. In the wireless connection, the signal of each sensor was reconstructed by canceling mutual interference by the MSMA in the receiver.

In this demonstration experiment, 1ch, 3ch, and 9ch were selected as a channel arrangement in which the three sensors are interferences.

Figure 15A:
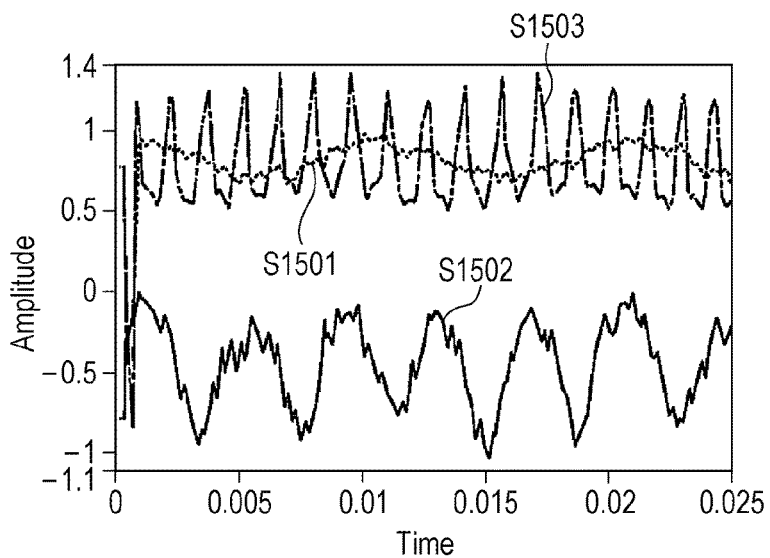
FIG. 15 is a waveform diagram showing waveforms of signals received by wireless connection from three sensors before interference cancellation according to the present invention is performed, a waveform diagram showing waveforms after interference cancellation according to the present invention is performed, and a waveform diagram showing waveforms of signals received by wired connection from the three sensors.

FIG. 15A is a waveform diagram showing waveforms of signals received from the three sensors by wireless connection before the interference cancellation according to the present invention is performed. In FIG. 15A, a signal S1501 indicates 1ch, a signal S1502 indicates 3ch, and a signal S1503 indicates 9ch. In the signal S1502 and the signal S1503, disturbance of the waveform due to interference can be confirmed.

Figure 15B:
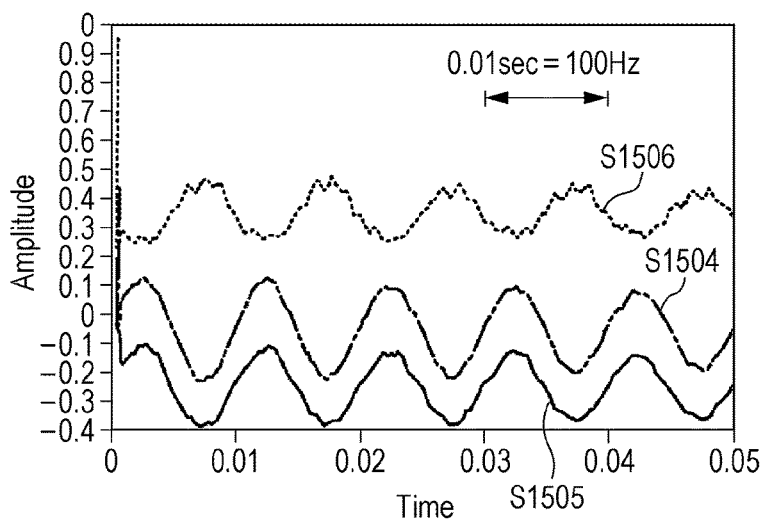

FIG. 15B is a waveform diagram showing waveforms of signals received from the three sensors by wireless connection after interference cancellation according to the present invention is performed. In FIG. 15B, a signal S1504 indicates 1ch, a signal S1505 indicates 3ch, and a signal S1506 indicates 9ch.

Figure 15C:
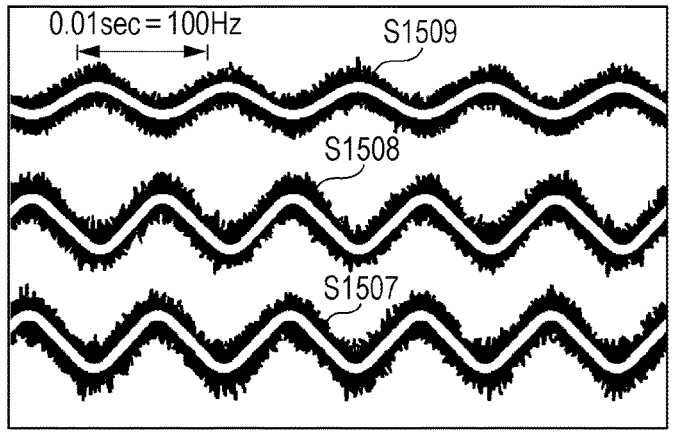

FIG. 15C is a waveform diagram showing waveforms of signals received from the three sensors by wired connection. FIG. 15C is a screen capture of a digital oscilloscope. In FIG. 15C, a signal S1507 indicates 1ch, a signal S1508 indicates 3ch, and a signal S1509 indicates 9ch.

Referring to FIG. 15C, in the signals S1507 and S1508, signals having substantially the same phase and substantially the same amplitude are output. In the signals S1507 and S1509, the signal having a substantially opposite phase and about half the amplitude is output. It can be confirmed that states of these signals are roughly reproduced in FIG. 15B.

In the present embodiment, the wireless communication system 101 and the function as the software receiver 107 of the receiver 104 used for the wireless communication system 101 are disclosed.

In order to correctly demodulate the plurality of respective received radio waves simultaneously received from the plurality of sensor terminals 102 by performing accurate successive interference cancellation on the finite length data sequence 601 based on the received radio waves including interference components, the interference component obtained by multiplying, by an odd number, the frequency of the subcarrier wave having the lowest frequency is generated.

In order to generate the interference component, a Hilbert transform by the Hilbert transformer 605 is performed on the subcarrier data sequence 701 obtained by extracting a target subcarrier wave component from the finite length data sequence 601. Thus, the analysis data sequence 702 is generated. Further, the carrier phase difference Ψ703 is estimated from the subcarrier data sequence 701 by using regression analysis by the carrier wave phase estimation unit 606.

The angle calculator 706 returns the analysis data sequence 702 by the carrier phase difference Ψ703 by the rotation calculator 704, and then generates the angle data sequence 707. The angle data sequence 707 is odd-multiplied by the angle multiplier 708 and the amplitude divider 710 to be converted into the multiplied angle data sequence 711. Then, the inverse Hilbert transformer 612 performs the inverse Hilbert transform on the multiplied angle data sequence 711 to generate the odd multiplied harmonic data sequence 713 to be the interference component. Accurate interference component cancellation is realized by canceling the odd multiplied harmonic data sequence 713 from the subcarrier data sequence 701 including subcarrier waves of the same frequency.

Although the embodiments of the present invention have been described above, the present invention is not limited to the above embodiment. Other modifications and applications are included without departing from the spirits and scope of the present invention described in claims.

For example, in the above-described embodiments, the configuration of the apparatus and the system have been described in detail and concretely in order to describe the present invention in an easy-to-understand manner. The present invention is not necessarily limited to the apparatus or system having all the configurations described above. Further, a part of the configuration of an embodiment can be replaced by the configuration of another embodiment. Further, the configuration of another embodiment can also be added to the configuration of an embodiment. Furthermore, addition, deletion, and/or substitution of other configurations can be made to a part of the configuration of each embodiment.

In addition, part or all of the above-described configurations, functions, processors, and the like may be realized by hardware such as, for example, by designing as an integrated circuit. Further, each of the above-described configurations, functions, and the like may be realized by software configured to interpret and execute, by the processor, a program configured to realize respective functions. Information such as programs, tables, files, and the like configured to realize the respective functions can be stored in a volatile or nonvolatile storage such as a memory, a hard disk, and an SSD (Solid State Drive), or a recording medium such as an IC card and an optical disk.

In addition, regarding control lines and information lines, what is considered necessary for description is shown. Not all control lines or information lines are necessarily shown in view of the product. In practice, it can be considered that almost all the components are mutually connected.

DESCRIPTION OF REFERENCE SIGNS

101: Wireless communication system, 102: Sensor terminal, 103: Interrogator, 104: Receiver, 105: IQ converter, 106: Network, 107: Software receiver, 201: Antenna, 202: Power supply unit, 203: Modulator, 204: SPDT switch, 205: Controller, 206: Subcarrier wave source, 207: Sensor, 210: Received data, 301: Antenna, 302: Local oscillator, 303: Mixer, 304: LPF, 305: Demodulator, 306: A/D converter, 307: controller, 308: D/A converter, 309: Modulator, 310: Carrier wave source, 311: Sensor terminal list, 401: Antenna, 402: Tuning circuit, 403: RF amplifier, 404: First mixer, 405: Second mixer, 406: Local oscillator, 407: Phase shifter, 408: First LPF, 409: Second LPF, 410: A/D converter, 501: CPU, 502: ROM, 503: RAM, 504: Display unit, 505: Operation unit, 506: Nonvolatile storage, 507: Bus, 508: NIC, 601: Finite length data sequence, 602: HPF, 603: BPF, 604: Input/output controller, 605: Hilbert transformer, 606: Carrier wave phase estimation unit, 607: Analysis data converter, 608: Demodulator, 609: Demodulated data sequence, 610: PLL processor, 611: Angle multiplication processor, 612: Inverse Hilbert transformer, 613: Interference canceller, 614: Interference cancellation calculator,

701: Subcarrier data sequence, 702: Analysis data sequence, 703: Carrier phase difference Ψ, 704: Rotation calculator, 705: Rotation analysis data sequence, 706: Angle calculator, 707: Angle data sequence, 708: Angle multiplier, 710: Amplitude divider, 711: Multiplied angle data sequence, 713: Odd multiplied harmonic data sequence, 715: Interference canceled subcarrier data sequence, 1401: Software receiver, 1402a: First channel processor, 1402b: Second channel processor, 1402c: Third channel processor, 1402d: Fourth channel processor, 1402e: Fifth channel processor, 1402p: Sixteenth channel processor, 1403: Distributor

The invention claimed is:

1. A wireless communication system comprising:
a carrier wave source configured to emit an unmodulated carrier wave;
a plurality of passive terminals configured to superimpose, on the carrier wave, a subcarrier wave having a predetermined frequency for each terminal, modulate the subcarrier wave, according to a predetermined modulation method, based on a signal generated by a signal source, and transmit a backscatter; and
a receiver configured to receive a plurality of backscatters transmitted from the plurality of passive terminals, and demodulate the signal of the signal source in each passive terminal by successively canceling interference components, wherein
the receiver comprises:
an IQ converter configured to generate a finite length data sequence having an I component and a Q component by applying a received radio wave to frequency conversion and orthogonal transformation;
a high-pass filter configured to cancel a DC component from the finite length data sequence;
a first band pass filter configured to form a first subcarrier data sequence by selectively passing frequency of the subcarrier wave included in the finite length data sequence that has passed through the high-pass filter;
a second band pass filter configured to form a second subcarrier data sequence by selectively passing frequency of the subcarrier wave different from that of the first band pass filter;
a Hilbert transformer configured to perform Hilbert transform on the subcarrier data sequence to generate an analysis data sequence;
a carrier wave phase estimation unit configured to estimate a phase delay of the carrier wave included in the subcarrier data sequence to obtain a carrier phase difference;
a PLL processor configured to generate an angle data sequence from the analysis data sequence and from the carrier phase difference;
an angle multiplication processor configured to multiply the angle data sequence by a desired odd number of multiplication to obtain a multiplied angle data sequence;
an inverse Hilbert transformer configured to obtain an odd multiplied harmonic data sequence by performing projective transformation using the multiplied angle data sequence, the carrier phase difference, and an amplitude adjustment value taken out from the analysis data sequence; and
an interference canceller configured to subtract the odd multiplied harmonic data sequence from the second subcarrier data sequence.

2. The wireless communication system according to claim 1, wherein the carrier wave phase estimation unit estimates the phase delay using a regression analysis.

3. The wireless communication system according to claim 2, wherein the PLL processor comprises:
a rotation calculator configured to obtain, by correcting a phase of the analysis data sequence by the carrier phase difference, a rotation analysis data sequence having an I component and a Q component; and
an angle calculator configured to calculate an angle of the rotation analysis data sequence to generate the angle data sequence.

4. The wireless communication system according to claim 3, wherein
the PLL processor, the angle multiplication processor, the inverse Hilbert transformer, and the interference canceller are included in an interference cancellation calculator, and
the interference cancellation calculator is provided according to the number of interference components to be canceled from the finite length data sequence.

5. A wireless communication system according to claim 4, wherein when a channel is configured by disposing two or more of the band pass filters while detuning the carrier wave by an integral multiple of basic bandwidth, the channel is divided into an odd channel group and an even channel group by counting the channel from a channel close to the carrier wave, and the carrier wave phase estimation unit, the angle calculator, the Hilbert transformer, and the interference canceller are each independently processed in the odd channel group and the even channel group.

* * * * *